United States Patent
Piao et al.

(10) Patent No.: US 12,250,394 B2
(45) Date of Patent: *Mar. 11, 2025

(54) VIDEO ENCODING METHOD FOR PERFORMING AFFINE MODEL-BASED PREDICTION BY CONSIDERING ENCODING ORDER, AND DEVICE THEREFOR, AND VIDEO DECODING METHOD FOR PERFORMING AFFINE MODEL-BASED PREDICTION BY CONSIDERING DECODING ORDER, AND DEVICE THEREFOR

(71) Applicant: SAMSUNG ELECTRONICS CO., LTD., Suwon-si (KR)

(72) Inventors: Yinji Piao, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,754

(22) Filed: Aug. 10, 2023

(65) Prior Publication Data

US 2023/0396789 A1 Dec. 7, 2023

Related U.S. Application Data

(63) Continuation of application No. 17/525,305, filed on Nov. 12, 2021, now Pat. No. 11,750,827, which is a
(Continued)

(51) Int. Cl.
*H04N 19/132* (2014.01)
*H04N 19/105* (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC .. H04N 19/139; H04N 19/105; H04N 19/132; H04N 19/176; H04N 19/136;
(Continued)

(56) References Cited

U.S. PATENT DOCUMENTS

| 8,913,665 B2 | 12/2014 | Wahadaniah et al. |
| 10,448,010 B2 | 10/2019 | Chen et al. |

(Continued)

FOREIGN PATENT DOCUMENTS

| CN | 108605137 A | 9/2018 |
| CN | 109792533 A | 5/2019 |

(Continued)

OTHER PUBLICATIONS

Communication dated Jan. 19, 2024, issued by the Korean Intellectual Property Office in Korean Patent Application No. 10-2023-0039916.
(Continued)

*Primary Examiner* — Hesham K Abouzahra
(74) *Attorney, Agent, or Firm* — Sughrue Mion, PLLC

(57) ABSTRACT

A video decoding method includes, when inter prediction of a current block is performed in an affine merge mode, generating an affine merge candidate list including a control point-based affine merge candidate corresponding to control point motion vectors determined by using motion vectors of neighboring blocks included in a block group of representative neighboring blocks according to corners of the current block, determining an affine motion vector of the current block by using control point motion vectors corresponding to a merge candidate selected from the affine merge candi-
(Continued)

date list, and obtaining prediction samples of the current block by using the affine motion vector of the current block, wherein when a right block of the current block is available, a representative neighboring block adjacent to a lower right corner of the current block is a block whose available motion information is obtained from among a neighboring block adjacent to the lower right corner of the current block and a right boundary of the current block and a neighboring block diagonally adjacent to the lower right corner of the current block.

3 Claims, 27 Drawing Sheets

Related U.S. Application Data continuation of application No. PCT/KR2020/095085, filed on Jun. 26, 2020.

(60) Provisional application No. 62/866,704, filed on Jun. 26, 2019.

(51) Int. Cl.
*H04N 19/159* (2014.01)
*H04N 19/176* (2014.01)
*H04N 19/44* (2014.01)
*H04N 19/46* (2014.01)

(52) U.S. Cl.
CPC ......... *H04N 19/159* (2014.11); *H04N 19/176* (2014.11); *H04N 19/46* (2014.11)

(58) Field of Classification Search
CPC .. H04N 19/186; H04N 19/573; H04N 19/577; H04N 19/147
See application file for complete search history.

(56) References Cited

U.S. PATENT DOCUMENTS

| | | | |
|---|---|---|---|
| 11,363,267 B2 | 6/2022 | Tamse et al. | |
| 11,405,605 B2 | 8/2022 | Piao et al. | |
| 2019/0058896 A1 | 2/2019 | Huang et al. | |
| 2020/0112738 A1* | 4/2020 | Lee | H04N 19/136 |
| 2020/0221087 A1* | 7/2020 | Tamse | H04N 19/119 |

FOREIGN PATENT DOCUMENTS

| | | |
|---|---|---|
| KR | 10-2014-0092760 A | 7/2014 |
| KR | 10-2018-0134853 A | 12/2018 |
| KR | 10-2019-0044533 A | 4/2019 |
| KR | 10-2019-0058503 A | 5/2019 |
| WO | 2017/118409 A1 | 7/2017 |
| WO | 2018/084523 A1 | 5/2018 |
| WO | 2018/226066 A1 | 12/2018 |
| WO | 2019/066574 A1 | 4/2019 |

OTHER PUBLICATIONS

Communication dated Mar. 13, 2024, issued by the India Intellectual Property Office in Indian Patent Application No. 202127054069.
Communication dated Nov. 26, 2020 issued by the Korean Patent Office in counterpart Korean Application No. 10-2020-0078821.
Kiho Choi et al., "[EVC] Suggested improvements for EVC WD (M48879)", Shape the Future with Innovation and Intelligence, Jul. 6, 2019, XP030222303, 14 pages total.
Communication dated Oct. 15, 2020 issued by the International Searching Authority in counterpart Application No. PCT/KR2020/095085 (PCT/ISA/220, PCT/ISA/210, and PCT/ISA/237).
Kiho Choi et al., "[EVC] Suggested improvements for EVC WD", ISO/IEC JTC1/SC29/WG11 MPEG2018/M48879, International Organisation for Standardisation Organisation Internationale De Normalisation ISO/IEC JTC1/SC29/WG11 Coding of Moving Pictures and Audio, Jul. 1, 2019, XP030222298, 11 pages total.
Yinji Piao et al., "CE1.4 : Split Unit Coding Order", Joint Video Experts Team (JVET) of ITU-T SG 16 WP 3 and ISO/IEC JTC 1/SC 29/WG 11, Document: JVET-K0133-v1, Jul. 3, 2018, XP030195771, 6 pages total.
Communication dated Oct. 15, 2021 issued by the Korean Patent Office in counterpart Korean Application No. 10-2021-0022027.
Communication dated Jun. 2, 2022 issued by the European Patent Office in counterpart European Application No. 20833097.7.
Sri Nitchith Akula et al., "Description of SDR, HDR and 360° video coding technology proposal considering mobile application scenario by Samsung, Huawei, GoPro, and HiSilicon", Joint Video Exploration Team (JVET) of ITU-T SG 16 WP 3 and ISO/IEC JTC 1/SC 29/VG 11, Document: JVET-J0024, Apr. 3, 2018, XP030151189, 119 pages total.
Communication dated Aug. 10, 2020 issued by the Korean Patent Office in counterpart Korean Application No. 10-2020-0078821.
Communication dated Aug. 1, 2022 issued by the Korean Intellectual Property Office in counterpart Korean Application No. 10-2022-0088576.
"Test Model of Essential Video Coding (ETM 2.0)", ISO/IEC JTC 1/SC 29/WG 11, N18449, International Organisation for Standardisation Organisation Internationale De Normalisation ISO/IEC JTC 1/SC 29/WG 11 Coding of Moving Pictures and Audio, May 17, 2019, XP030208722, 21 pages total.
Office Action dated Oct. 11, 2024, issued by Chinese Patent Office in Chinese Patent Application No. 202080046476.2.

* cited by examiner

FIG. 4
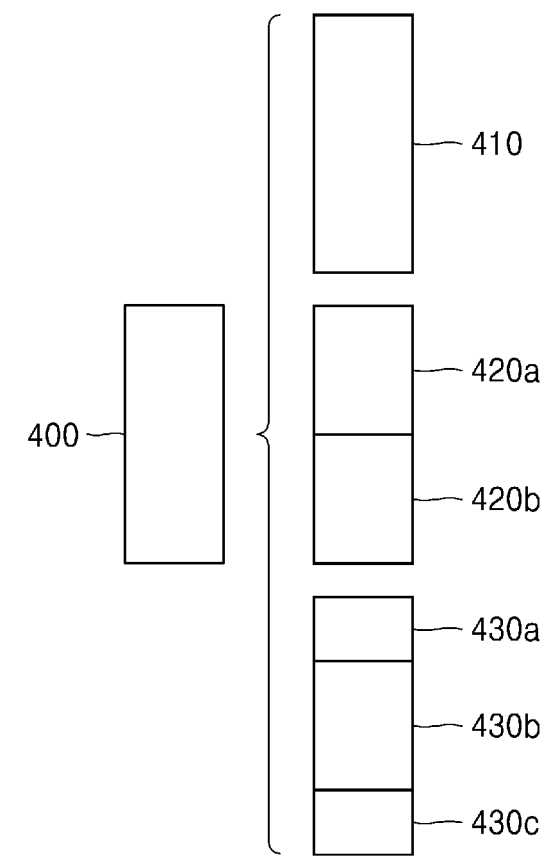
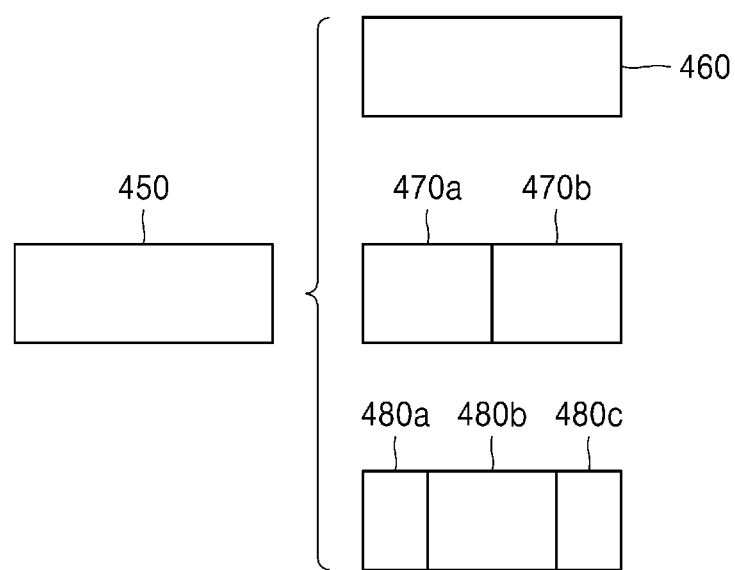

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

VIDEO ENCODING METHOD FOR PERFORMING AFFINE MODEL-BASED PREDICTION BY CONSIDERING ENCODING ORDER, AND DEVICE THEREFOR, AND VIDEO DECODING METHOD FOR PERFORMING AFFINE MODEL-BASED PREDICTION BY CONSIDERING DECODING ORDER, AND DEVICE THEREFOR

CROSS-REFERENCE TO RELATED APPLICATION(S)

This is a Continuation of U.S. application Ser. No. 17/525,305 filed Nov. 12, 2021, which is a Continuation Application of International Application PCT/KR2020/095085 filed on Jun. 26, 2020, which claims benefit of the U.S. Provisional Patent Application No. 62/866,704 filed on Jun. 26, 2019, the disclosures of which are incorporated herein in their entireties by reference.

BACKGROUND

1. Field

The present disclosure relates to the fields of image encoding and decoding. In particular, the present disclosure relates to a method and apparatus for encoding and decoding a video by splitting an image into blocks of various shapes.

2. Description of Related Art

In a compression method according to the related art, in a process of determining a size of a coding unit included in a picture, it is determined whether to split the coding unit, and then square coding units are determined through a recursive splitting process of uniformly splitting the coding unit into four coding units having the same size. However, recently, quality degradation of a reconstructed image caused by the use of uniform square coding units for a high-resolution image has been a problem. Accordingly, methods and apparatuses for splitting a high-resolution image into coding units of various shapes are proposed.

SUMMARY

Provided are a method of determining a neighboring block that is referenceable when inter prediction is performed in an affine mode in an environment in which a coding order between adjacent coding units may be changed.

A video decoding method according to an embodiment of the present disclosure includes: when inter prediction of a current block is performed in an affine merge mode, generating an affine merge candidate list including a control point-based affine merge candidate corresponding to control point motion vectors determined by using motion vectors of neighboring blocks included in a block group of representative neighboring blocks according to corners of the current block; and determining an affine motion vector of the current block by using control point motion vectors corresponding to a merge candidate selected from the affine merge candidate list, and obtaining prediction samples of the current block by using the affine motion vector of the current block, wherein, when a right block of the current block is available, a representative neighboring block adjacent to a lower right corner of the current block is a block whose available motion information is obtained from among a neighboring block adjacent to the lower right corner of the current block and a right boundary of the current block and a neighboring block diagonally adjacent to the lower right corner of the current block, and when the right block of the current block is not available, a representative neighboring block adjacent to the lower right corner of the current block is a collocated block located at a point diagonally adjacent to the lower right corner of the current block, and the collocated block is included in a collocated picture.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates a process by which an image decoding apparatus determines at least one coding unit by splitting a non-square coding unit, according to an embodiment.

FIG. 13 illustrates a process of determining a depth of a coding unit when a shape and size of the coding unit change, when the coding unit is recursively split such that a plurality of coding units are determined, according to an embodiment.

DETAILED DESCRIPTION

Figure 1:
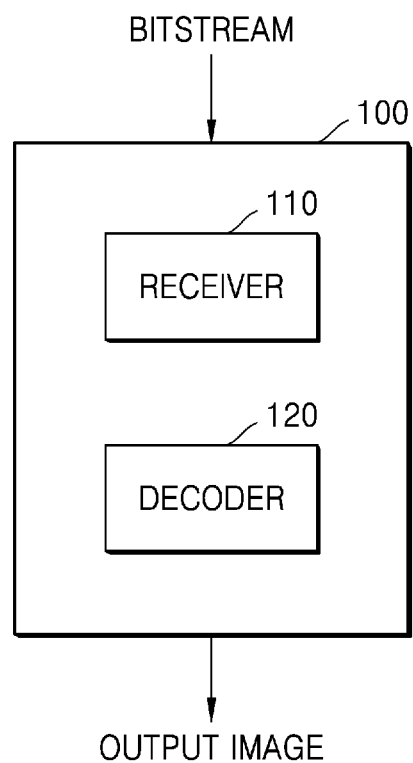
FIG. 1 is a block diagram of an image decoding apparatus according to an embodiment.

A video decoding method according to an embodiment of the present disclosure includes: when inter prediction of a current block is performed in an affine merge mode, generating an affine merge candidate list including a control point-based affine merge candidate corresponding to control point motion vectors determined by using motion vectors of neighboring blocks included in a block group of representative neighboring blocks according to corners of the current block; and determining an affine motion vector of the current block by using control point motion vectors corresponding to a merge candidate selected from the affine merge candidate list, and obtaining prediction samples of the current block by using the affine motion vector of the current block, wherein, when a right block of the current block is available, a representative neighboring block adjacent to a lower right corner of the current block is a block whose available motion information is obtained from among a neighboring block adjacent to the lower right corner of the current block and a right boundary of the current block and a neighboring block diagonally adjacent to the lower right corner of the current block, and when the right block of the current block is not available, a representative neighboring block adjacent to the lower right corner of the current block is a collocated block located at a point diagonally adjacent to the lower right corner of the current block, and the collocated block is included in a collocated picture.

According to an embodiment, the generating of the affine merge candidate list including the control point-based affine merge candidate may include: determining availability of motion information of a first representative neighboring block adjacent to an upper left corner of the current block, availability of motion information of a second representative neighboring block adjacent to an upper right corner of the current block, availability of motion information of a third representative neighboring block adjacent to a lower left corner of the current block, and availability of motion information of a fourth representative neighboring block adjacent to the lower right corner of the current block; and determining a control point-based affine merge candidate corresponding to a block group including a plurality of representative neighboring blocks, based on availability of motion information of at least one of the first representative neighboring block, the second representative neighboring block, the third representative neighboring block, and the fourth representative neighboring block.

According to an embodiment, the determining of the control point-based affine merge candidates may include: when the availability of the motion information of the first representative neighboring block adjacent to the upper left corner of the current block, the availability of the motion information of the second representative neighboring block adjacent to the upper right corner of the current block, and the availability of the motion information of the third representative neighboring block adjacent to the lower left corner of the current block, respectively, indicate available, determining a first control point-based affine merge candidate corresponding to a block group including the first representative neighboring block, the second representative neighboring block, and the third representative neighboring block; when the availability of the motion information of the first representative neighboring block adjacent to the upper left corner of the current block, the availability of the motion information of the second representative neighboring block adjacent to the upper right corner of the current block, and the availability of the motion information of the fourth representative neighboring block adjacent to the lower right corner of the current block, respectively, indicate available, determining a second control point-based affine merge candidate corresponding to a block group including the first representative neighboring block, the second representative neighboring block, and the fourth representative neighboring block; when the availability of the motion information of the first representative neighboring block adjacent to the upper left corner of the current block, the availability of the motion information of the third representative neighboring block adjacent to the lower left corner of the current block, and the availability of the motion information of the fourth representative neighboring block adjacent to the lower right corner of the current block, respectively, indicate available, determining a third control point-based affine merge candidate corresponding to a block group including the first representative neighboring block, the third representative neighboring block, and the fourth representative neighboring block; when the availability of the motion information of the second representative neighboring block adjacent to the upper right corner of the current block, the availability of the motion information of the third representative neighboring block adjacent to the lower left corner of the current block, and the availability of the motion information of the fourth representative neighboring block adjacent to the lower right corner of the current block, respectively, indicate available, determining a fourth control point-based affine merge candidate corresponding to a block group including the second representative neighboring block, the third representative neighboring block, and the fourth representative neighboring block; when the availability of the motion information of the first representative neighboring block adjacent to the upper left corner of the current block and the availability of the motion information of the second representative neighboring block adjacent to the upper right corner of the current block, respectively, indicate available, determining a fifth control point-based affine merge candidate corresponding to a block group including the first representative neighboring block and the second representative neighboring block; and when the availability of the motion information of the first representative neighboring block adjacent to the upper left corner of the current block and the availability of the motion information of the third representative neighboring block adjacent to the lower left corner of the current block, respectively, indicate available, determining a sixth control point-based affine merge candidate corresponding to a block group including the first representative neighboring block and the third representative neighboring block.

According to an embodiment, when a left block of the current block is available, a representative neighboring block adjacent to a lower left corner of the current block may be a block whose available motion information is obtained from among a neighboring block diagonally adjacent to the lower left corner of the current block and a neighboring block adjacent to the lower left corner of the current block and a left boundary of the current block, and when the left block of the current block is not available, a representative neighboring block adjacent to the lower left corner of the current block may be a collocated block located at a point diagonally adjacent to the lower left corner of the current block, and the collocated block is included in a collocated picture.

According to an embodiment, a representative neighboring block adjacent to an upper left corner of the current block may be a block whose available motion information is obtained from among a neighboring block diagonally adjacent to the upper left corner of the current block, a neighboring block adjacent to the upper left corner of the current block and an upper boundary of the current block, and a neighboring block adjacent to the upper left corner of the current block and a left boundary of the current block.

According to an embodiment, a representative neighboring block adjacent to an upper right corner of the current block may be a block whose available motion information is obtained from among a neighboring block diagonally adjacent to the upper right corner of the current block, a neighboring block adjacent to the upper right corner of the current block and an upper boundary of the current block, and a neighboring block adjacent to the upper right corner of the current block and a right boundary of the current block.

According to an embodiment, the generating of the affine merge candidate list may include: obtaining, from a bitstream, a merge mode flag indicating whether an inter prediction mode of the current block is a merge mode; when the merge mode flag indicates the merge mode, obtaining, from the bitstream, an affine flag indicating whether motion compensation based on an affine model is performed to generate a prediction sample of the current block; when the affine flag indicates that the motion compensation based on the affine model is performed, generating an affine merge candidate list including affine merge candidates determined based on an available neighboring block from among neighboring blocks at a certain location adjacent to the current block; and when the number of the affine merge candidates is less than a predetermined number, adding the control point-based affine merge candidate to the affine merge candidate list.

According to an embodiment, the determining of the affine motion vector of the current block may include determining a horizontal change amount of a motion vector, a vertical change amount of the motion vector, and a base motion vector by using the control point motion vectors.

According to an embodiment, when the control point-based affine merge candidate is selected from the affine merge candidate list, a reference index, a prediction direction, and the control point motion vectors corresponding to the affine merge candidate may be determined by using a reference index, a prediction direction, and a motion vector of representative neighboring blocks adjacent to corners of the current block belonging to a block group corresponding to the control point-based affine merge candidate, and a reference index, a prediction direction, and an affine motion vector of the current block may be determined by using the reference index, the prediction direction, and the control point motion vectors corresponding to the affine merge candidate.

A video decoding apparatus according to an embodiment of the present disclosure includes: an affine merge candidate list determiner configured to, when inter prediction of a current block is performed in an affine merge mode, generate an affine merge candidate list including a control point-based affine merge candidate corresponding to control point motion vectors determined by using motion vectors of neighboring blocks included in a block group of representative neighboring blocks according to corners of the current block; and an affine mode predictor configured to determine an affine motion vector of the current block by using control point motion vectors corresponding to a merge candidate selected from the affine merge candidate list, and obtain prediction samples of the current block by using the affine motion vector of the current block, wherein, when a right block of the current block is available, a representative neighboring block adjacent to a lower right corner of the current block is a block whose available motion information is obtained from among a neighboring block adjacent to the lower right corner of the current block and a right boundary of the current block and a neighboring block diagonally adjacent to the lower right corner of the current block, and when the right block of the current block is not available, a representative neighboring block adjacent to the lower right corner of the current block is a collocated block located at a point diagonally adjacent to the lower right corner of the current block, and the collocated block is included in a collocated picture.

A video encoding method according to an embodiment of the present disclosure includes: when inter prediction of a current block is performed in an affine merge mode, generating an affine merge candidate list including a control point-based affine merge candidate corresponding to control point motion vectors determined by using motion vectors of neighboring blocks included in a block group of representative neighboring blocks according to corners of the current block; and encoding a merge index indicating a merge candidate used to determine control point motion vectors for performing inter prediction on the current block in an affine mode, from the affine merge candidate list, wherein, when a right block of the current block is available, a representative neighboring block adjacent to a lower right corner of the current block is a block whose available motion information is obtained from among a neighboring block adjacent to the lower right corner of the current block and a right boundary of the current block and a neighboring block diagonally adjacent to the lower right corner of the current block, and when the right block of the current block is not available, a representative neighboring block adjacent to the lower right corner of the current block is a collocated block located at a point diagonally adjacent to the lower right corner of the current block, and the collocated block is included in a collocated picture.

According to an embodiment, the video encoding method may further include: encoding a merge mode flag indicating whether an inter prediction mode of the current block is a merge mode; and encoding an affine flag indicating whether motion compensation based on an affine model is performed to generate a prediction sample of the current block.

According to an embodiment, a horizontal change amount of a motion vector, a vertical change amount of the motion vector, and a base motion vector may be determined by using the control point motion vectors, and an affine motion vector of the current block may be predicted by using the horizontal change amount of the motion vector, the vertical change amount of the motion vector, and the base motion vector.

There is provided a computer-readable recording medium having recorded thereon a program for executing a video decoding method according to an embodiment of the present disclosure by using a computer.

There is provided a computer-readable recording medium having recorded thereon a program for executing a video encoding method according to an embodiment of the present disclosure by using a computer.

As the present disclosure allows for various changes and numerous examples, particular embodiments will be illustrated in the drawings and described in detail in the written description. However, this is not intended to limit the present disclosure to particular modes of practice, and it will be understood that all changes, equivalents, and substitutes that do not depart from the spirit and technical scope of various embodiments are encompassed in the present disclosure.

In the description of embodiments, certain detailed explanations of related art are omitted when it is deemed that they may unnecessarily obscure the essence of the present disclosure. Also, numbers (e.g., a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a 'unit' or a 'module', two or more elements may be combined into one element or one element may be divided into two or more elements according to subdivided functions. Also, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, coding unit, prediction unit, or transform unit of a current image to be encoded or decoded.

Also, in the present specification, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a unidirection may denote a motion vector used to indicate a block in a reference picture included in a list 0 or list 1, and a motion vector in a bidirection may denote that the motion vector includes a motion vector in a list 0 direction and a motion vector in a list 1 direction.

Also, in the present specification, the term 'binary splitting' refers to splitting a block into two sub-blocks whose width or height is half that of the block. In detail, when 'binary vertical splitting' is performed on a current block, because splitting is performed in a vertical direction at a point corresponding to half a width of the current block, two sub-blocks with a width that is half the width of the current block and a height that is equal to a height of the current block may be generated. When 'binary horizontal splitting' is performed on a current block, because splitting is performed in a horizontal direction at a point corresponding to half a height of the current block, two sub-blocks with a height that is half the height of the current block and a width that is equal to a width of the current block may be generated.

Also, in the present specification, the term 'ternary splitting' refers to splitting a width or a height of a block in a 1:2:1 ratio to generate three sub-blocks. In detail, when 'ternary vertical splitting' is performed on a current block, because splitting is performed in a vertical direction at a point corresponding to a 1:2:1 ratio of a width of the current block, two sub-blocks with a width that is ¼ of the width of the current block and a height that is equal to a height of the current block and one sub-block with a width that is ²⁄₄ of the width of the current block and a height that is equal to the height of the current block may be generated. When 'ternary horizontal splitting' is performed on a current block, because splitting is performed in a horizontal direction at a point corresponding to a 1:2:1 ratio of a height of the current block, two sub-blocks with a height that is ¼ of the height of the current block and a width that is equal to a width of the current block and one sub-block with a height that is ²⁄₄ of the height of the current block and a width that is equal to the width of the current block may be generated.

Also, in the present specification, the term 'quad-splitting' refers to splitting a width and a height of a block in a 1:1 ratio to generate four sub-blocks. In detail, when 'quad-splitting' is performed on a current block, because splitting is performed in a vertical direction at a point corresponding to half a width of the current block and is performed in a horizontal direction at a point corresponding to half a height of the current block, four sub-blocks with a width that is ½ of the width of the current block and a height that is ½ of the height of the current block may be generated.

Hereinafter, an image encoding apparatus and an image decoding apparatus, and an image encoding method and an image decoding method according to an embodiment will be described in detail with reference to FIGS. 1 through 16. A method of determining a data unit of an image according to an embodiment will be described with reference to FIGS. 3 through 16, and a video encoding/decoding method according to an embodiment will be described with reference to FIGS. 17 through 31.

Hereinafter, a method and apparatus for adaptive selection based on coding units of various shapes according to an embodiment of the present disclosure will be described in detail with reference to FIGS. 1 and 2.

FIG. 1 is a block diagram of an image decoding apparatus according to an embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described later. Also, the bitstream may be transmitted from the image encoding apparatus 2200. The image encoding apparatus 2200 and the image decoding apparatus 100 may be connected by wire or wirelessly, and the receiver 110 may receive the bitstream by wire or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
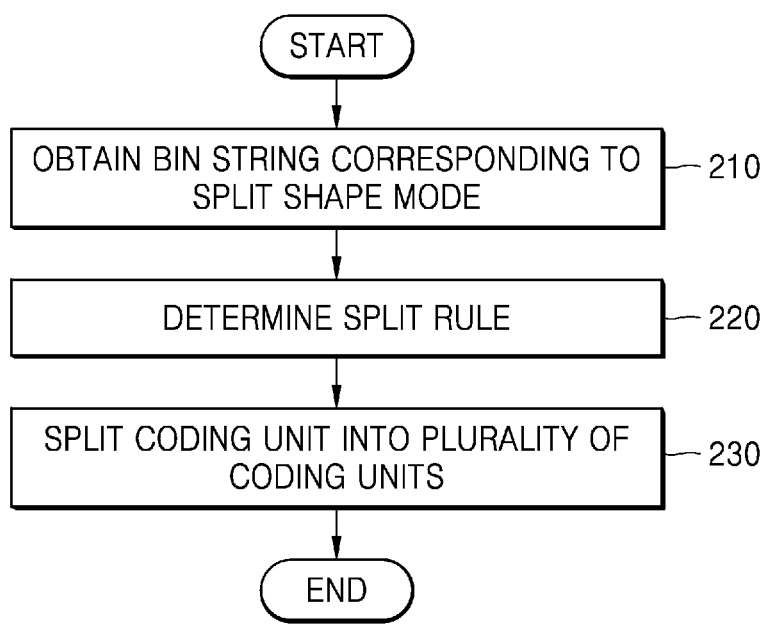
FIG. 2 is a flowchart of an image decoding method according to an embodiment.

FIG. 2 is a flowchart of an image decoding method according to an embodiment.

According to an embodiment of the present disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the present disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) denotes N×N blocks including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information on a maximum size of a luma coding block may be obtained from a bitstream. For example, the maximum size of the luma coding block indicated by the information on the maximum size of the luma coding block may be one of 4×4, 8×8, 16×16, 32×32, 64×64, 128×128, and 256×256.

For example, information on a luma block size difference and a maximum size of a luma coding block that may be split into two may be obtained from a bitstream. The information on the luma block size difference may refer to a size difference between a luma largest coding unit and a largest luma coding block that may be split into two. Accordingly, when the information on the maximum size of the luma coding block that may be split into two and the information on the luma block size difference obtained from the bitstream are combined with each other, a size of the luma largest coding unit may be determined. A size of a chroma largest coding unit may also be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information on a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad-splitting is performed, information indicating whether multi-splitting is performed, split direction information, and split type information may be obtained as the split shape mode information from the bitstream.

For example, the information indicating whether quad-splitting is performed may indicate whether a current coding unit is quad-split (QUAD_SPLIT) or not.

When the current coding unit is not quad-split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_BT_VERT).

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information on a largest coding unit indicates that splitting is not performed, a coding unit determined in the largest coding unit has the same size as that of the largest coding unit. When split shape code information on a largest coding unit indicates that splitting is performed, the largest coding unit may be split into coding units. Also, when split shape mode information on a coding unit indicates that splitting is performed, the coding unit may be split into smaller coding units. However, the splitting of the image is not limited thereto, and the largest coding unit and the coding unit may not be distinguished. The splitting of the coding unit will be described in more detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

Shapes and sizes of the transform block and prediction block may not be related to each other.

In another embodiment, prediction may be performed by using a coding unit as a prediction block. Also, transform may be performed by using a coding unit as a transform block.

The splitting of the coding unit will be described in more detail with reference to FIGS. 3 through 16. A current block and a neighboring block of the present disclosure may indicate one of the largest coding unit, the coding unit, the prediction block, and the transform block. Also, the current block or the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
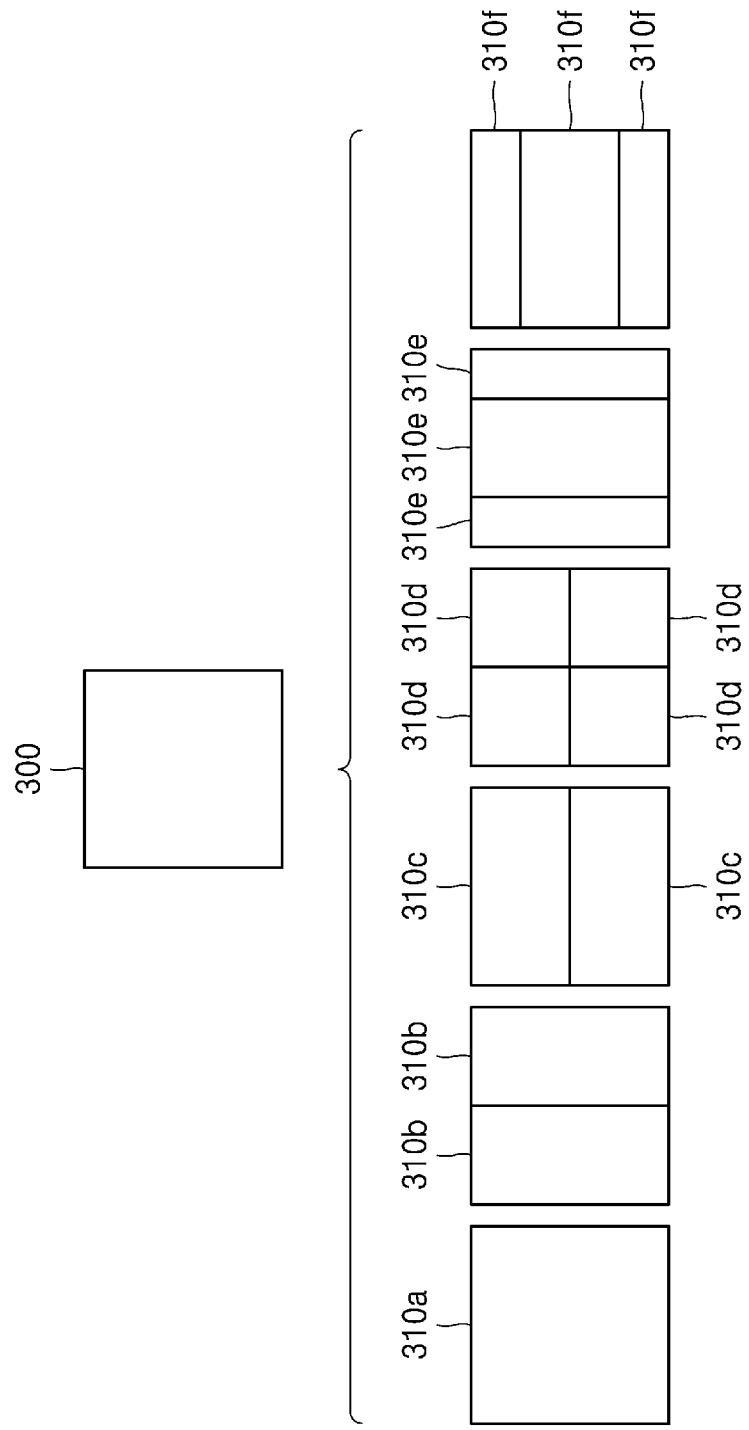
FIG. 3 illustrates a process by which an image decoding apparatus determines at least one coding unit by splitting a current coding unit, according to an embodiment.

FIG. 3 illustrates a process by which an image decoding apparatus determines at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or a size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square. When the shape of the coding unit is a non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad-split. Also, the image decoding apparatus 100 may determine split shape mode information with respect to the smallest coding unit to be "not to perform splitting". In particular, the image decoding apparatus 100 may determine the size of the largest coding unit to be 256×256. The image decoding apparatus 100 may determine the pre-agreed split shape mode information to be a quad-split. The quad-split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

FIG. 4 illustrates a process by which an image decoding apparatus determines at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a* to 430*c* by splitting the current coding unit 400 in the horizontal direction. Also, when the current coding unit 450 is in the horizontal direction, the image decoding apparatus 100 may determine the coding units 480*a* to 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c* or 480*a*, 480*b*, and 480*c* generated as the current coding unit 400 or 450 is split to be different from that of the other coding units 430*a* and 430*c*, or 480*a* or 480*c*. For example, the image decoding apparatus 100 may restrict the coding unit 430*b* or 480*b* at the center location to be no longer split or to be split only a certain number of times, unlike the other coding units 430*a* and 430*c*, or 480*a* and 480*c*.

Figure 5:
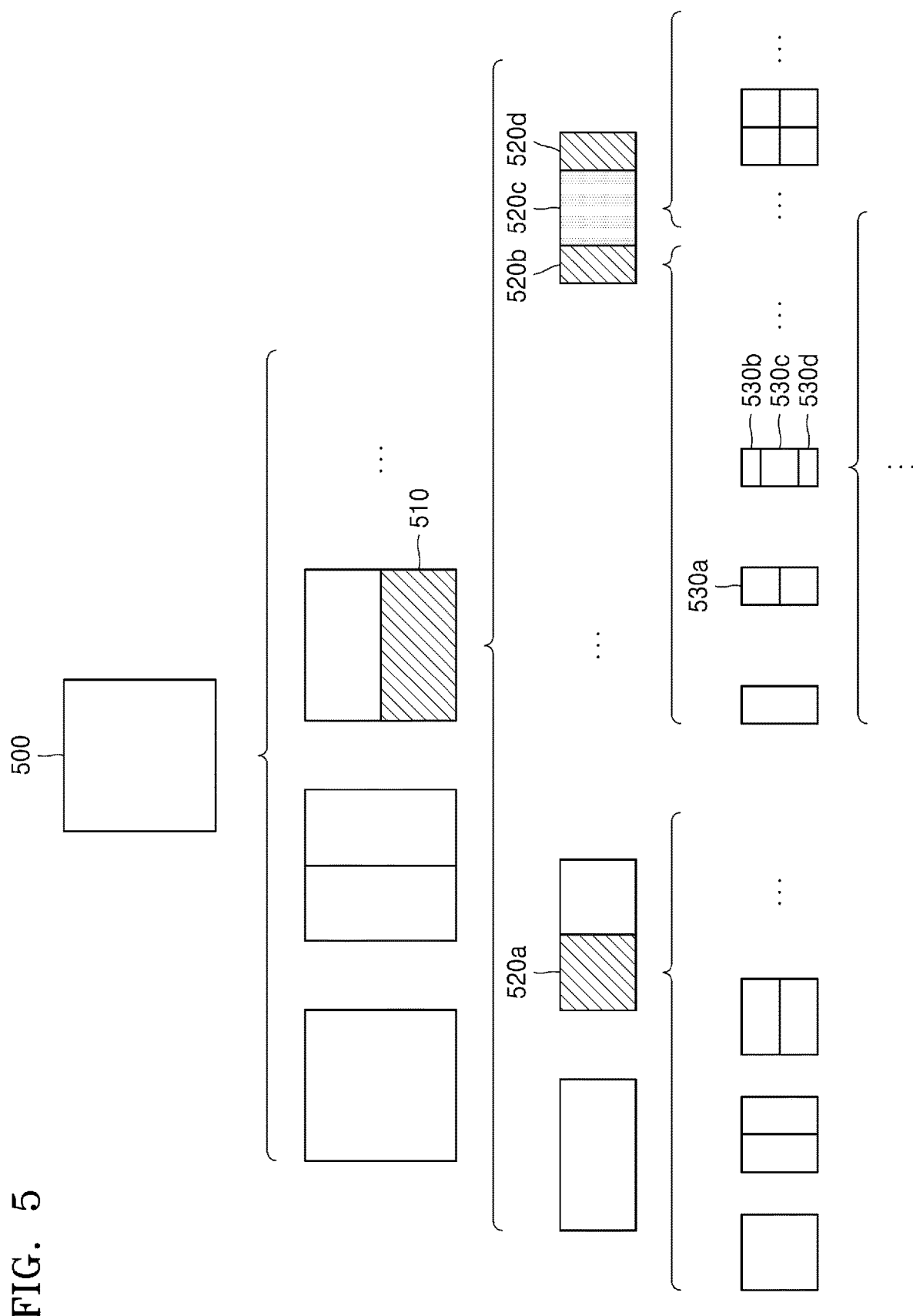
FIG. 5 illustrates a process by which an image decoding apparatus splits a coding unit based on at least one of block shape information and split shape mode information, according to an embodiment.

FIG. 5 illustrates a process by which an image decoding apparatus splits a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520*a*, or 520*b*, 520*c*, and 520*d* based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on the split shape mode information of each coding unit. Accordingly, a square coding unit may be determined by splitting a non-square coding unit, and a non-square coding unit may be determined by recursively splitting the square coding unit.

Referring to FIG. 5, a certain coding unit from among the odd number of third coding units 520*b*, 520*c*, and 520*d* determined by splitting the non-square second coding unit 510 (e.g., a coding unit at a center location or a square coding unit) may be recursively split. According to an embodiment, the square third coding unit 520*b* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a certain location in the current coding unit.

Figure 6:
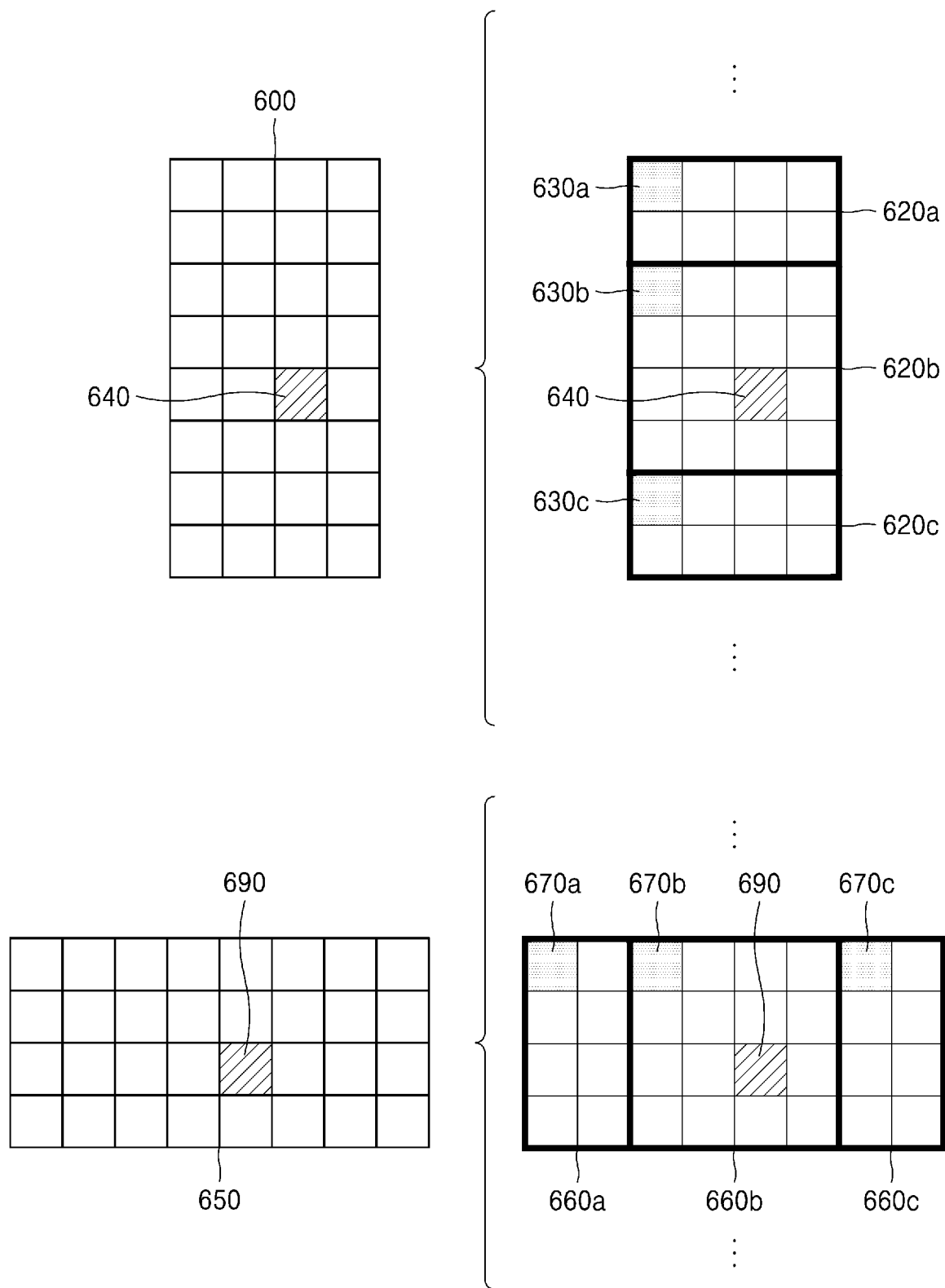
FIG. 6 illustrates a method by which an image decoding apparatus determines a certain coding unit from among an odd number of coding units, according to an embodiment.

FIG. 6 illustrates a method by which an image decoding apparatus determines a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information on the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment, the information indicating the locations of the upper left samples 630*a*, 630*b*, and 630*c*, which are included in the coding units 620*a*, 620*b*, and 620*c*, respectively, may include information on locations or coordinates of the coding units 620*a*, 620*b*, and 620*c* in a picture. According to an embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information on the locations or coordinates of the coding units 620*a*, 620*b*, and 620*c* in the picture, or by using the information on the widths or heights of the coding units, which correspond to the difference values between the coordinates.

According to an embodiment, information indicating the location of the upper left sample 630*a* of the upper coding unit 620*a* may include coordinates (xa, ya), information indicating the location of the upper left sample 630*b* of the middle coding unit 620*b* may include coordinates (xb, yb), and information indicating the location of the upper left sample 630*c* of the lower coding unit 620*c* may include coordinates (xc, yc). The image decoding apparatus 100 may determine the middle coding unit 620*b* by using the coordinates of the upper left samples 630*a*, 630*b*, and 630*c* which are included in the coding units 620*a*, 620*b*, and 620*c*, respectively. For example, when the coordinates of the upper left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper left samples 630*a*, 630*b*, and 630*c* may include coordinates indicating absolute locations in the picture, or may use coordinates (dxb, dyb) indicating a relative location of the upper left sample 630*b* of the middle coding unit 620*b* and coordinates (dxc, dyc) indicating a relative location of the upper left sample 630*c* of the lower coding unit 620*c* with reference to the location of the upper left sample 630*a* of the upper coding unit 620*a*. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a certain criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper left sample 630*a* of the upper coding unit 620*a*, the coordinates (xb, yb) that is the information indicating the location of the upper left sample 630*b* of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method by which the image decoding apparatus 100 determines a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660a, 660b, and 660c by using coordinates (xd, yd) that is information indicating the location of an upper left sample 670a of the left coding unit 660a, coordinates (xe, ye) that is information indicating the location of an upper left sample 670b of the middle coding unit 660b, and coordinates (xf, yf) that is information indicating the location of an upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe−xd. The image decoding apparatus 100 may determine the height of the left coding unit 660a to be the height of the current coding unit 650. According to an embodiment, the image decoding apparatus 100 may determine the width of the middle coding unit 660b to be xf−xe. The image decoding apparatus 100 may determine the height of the middle coding unit 660b to be the height of the current coding unit 600. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the certain location. However, the above-described method by which the image decoding apparatus 100 determines a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information on arbitrary locations of samples included in the coding units may be used.

According to an embodiment, the image decoding apparatus 100 may select a coding unit at a certain location from among an odd number of coding units determined by splitting the current coding unit, considering a shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information on the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information on a coding unit at a certain location may be used in a splitting operation to determine the coding unit at the certain location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, may determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width and height of the current coding unit in half, as the sample from which the certain information may be obtained, by using at least one of information on the width of the current coding unit and information on the height of the current coding unit. In another example, when the block shape information of the current coding unit indicates a non-square shape, the image decoding apparatus 100 may determine one of samples including a boundary for splitting a long side of the current coding unit in half, as the sample from which the preset information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and may split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
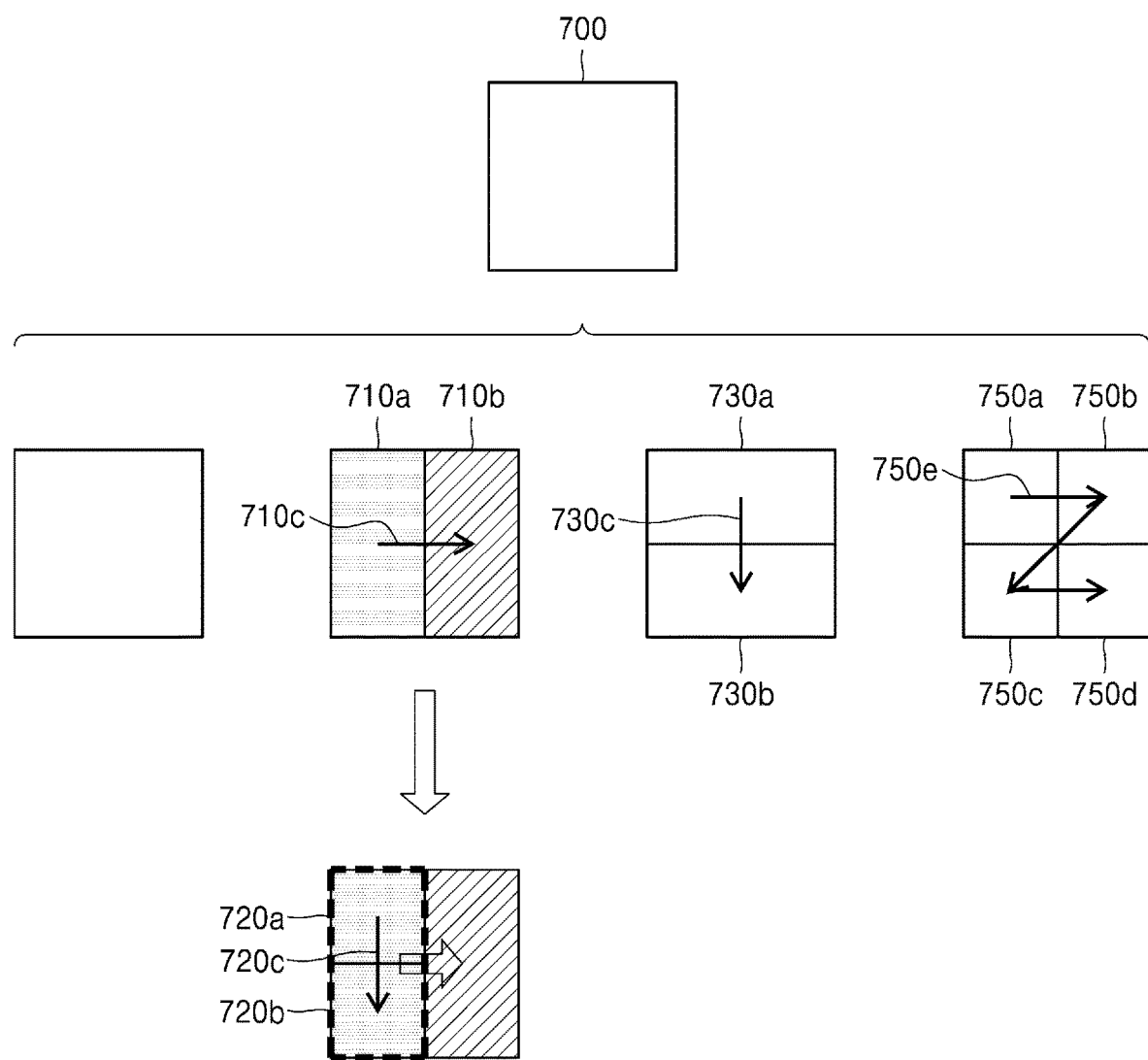
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a and 710b, 730a and 730b, or 750a to 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to have various shapes, in a certain order.

Figure 8:
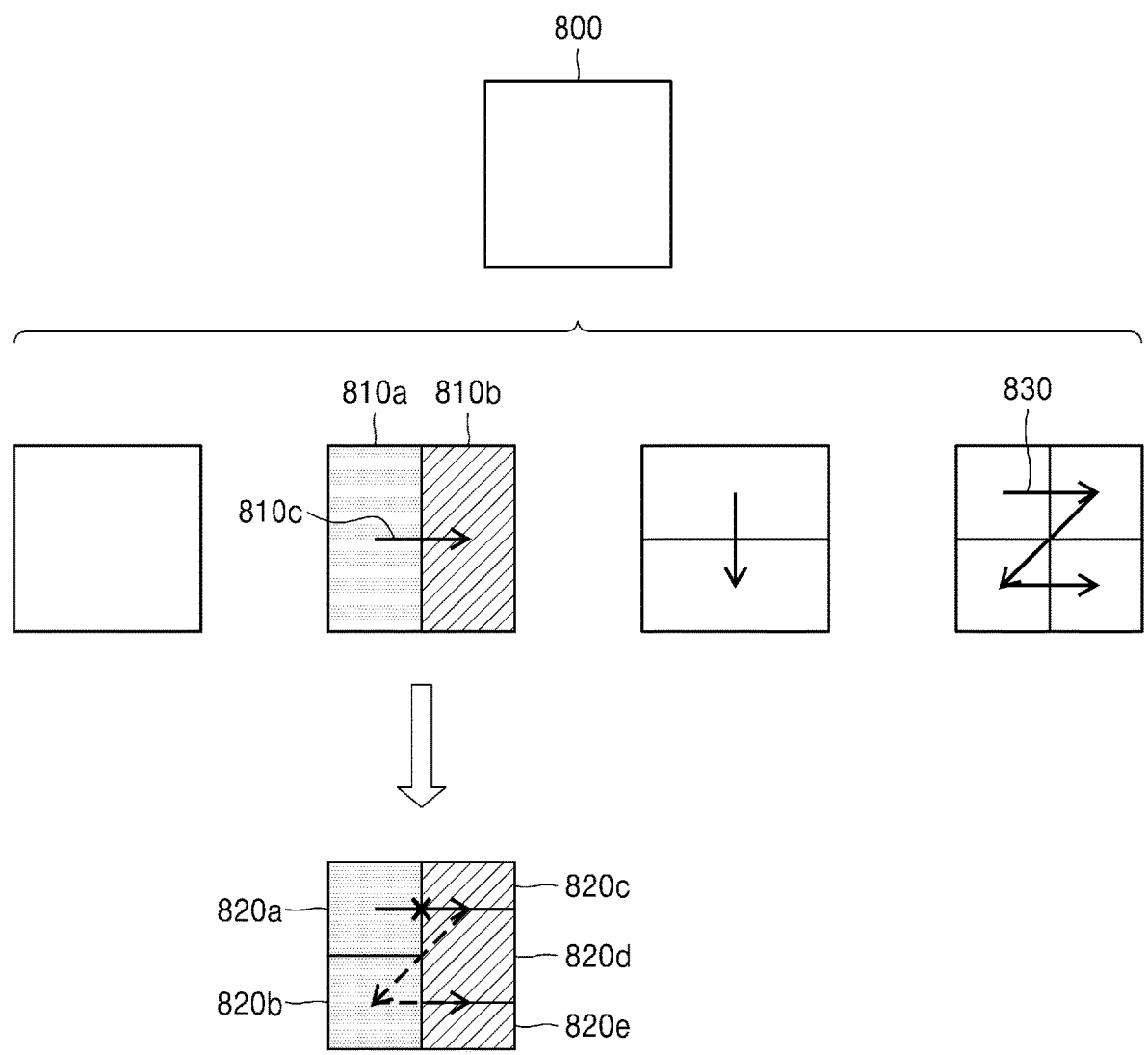
FIG. 8 illustrates a process by which an image decoding apparatus determines that a current coding unit is to be split into an odd number of coding units, when the coding units are not processable in a certain order, according to an embodiment.

FIG. 8 illustrates a process by which an image decoding apparatus determines that a current coding unit is to be split into an odd number of coding units, when the coding units are not processable in a certain order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of block shape information and the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c to 820e included in the first coding unit 800 satisfy the condition for processing in the certain order, and the condition relates to whether at least one of a width and height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

Figure 9:
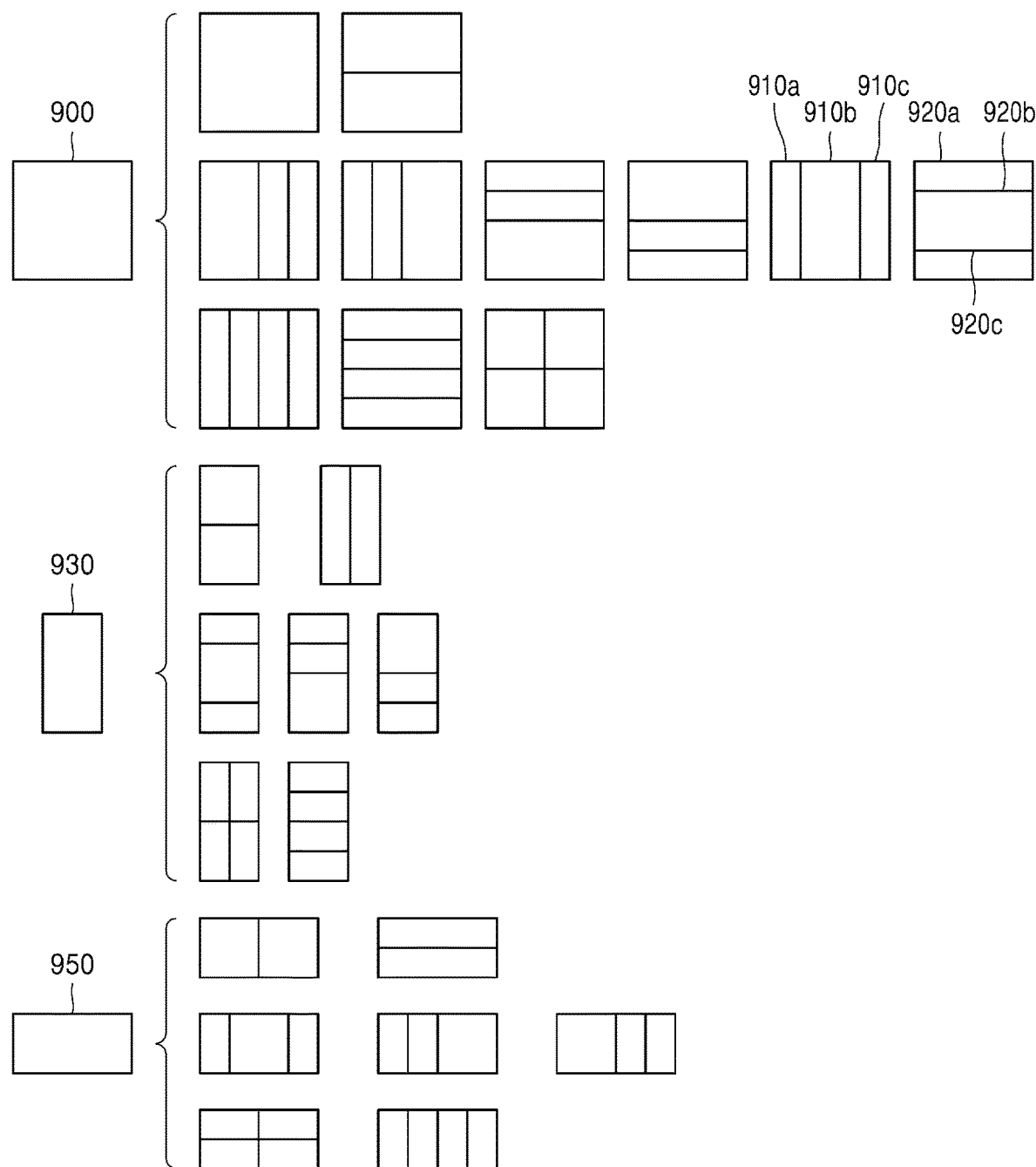
FIG. 9 illustrates a process by which an image decoding apparatus determines at least one coding unit by splitting a first coding unit, according to an embodiment.

FIG. 9 illustrates a process by which an image decoding apparatus determines at least one coding unit by splitting a first coding unit, according to an embodiment.

According to an embodiment, the image decoding apparatus 100 may split a first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. Also, because boundaries of the second coding units 920*a*, 920*b*, and 920*c* determined by splitting the square first coding unit 900 in a horizontal direction do not split the width of the first coding unit 900 in half, it may be determined that the first coding unit 900 does not satisfy the condition for processing in the certain order. When the condition is not satisfied as described above, the image decoding apparatus 100 may determine disconnection of a scan order, and may determine that the first coding unit 900 is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
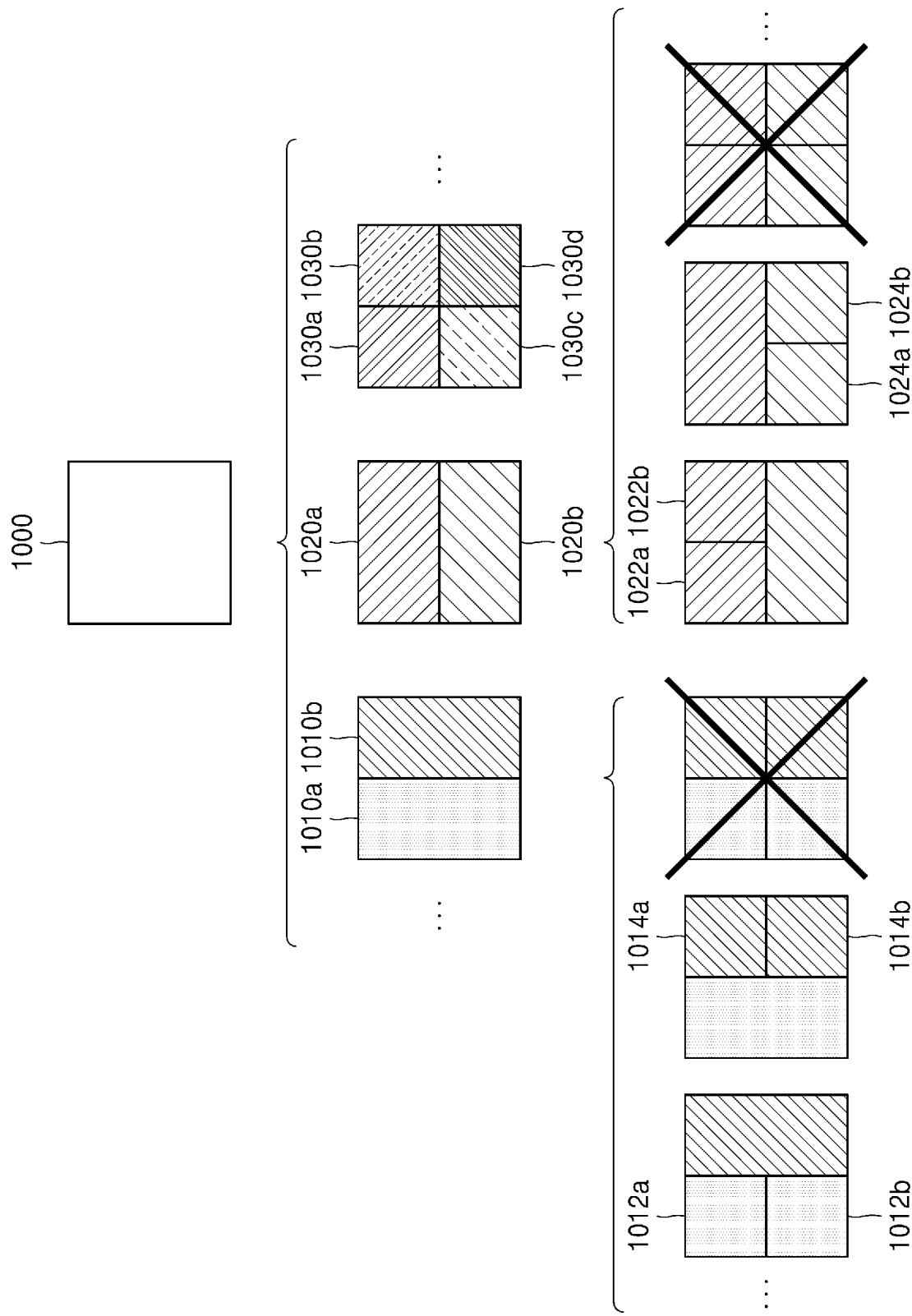
FIG. 10 illustrates that a shape into which a second coding unit is splittable is restricted when the second coding unit having a non-square shape, which is determined when an image decoding apparatus splits a first coding unit, satisfies a certain condition, according to an embodiment.

FIG. 10 illustrates that a shape into which a second coding unit is splittable is restricted when the second coding unit having a non-square shape, which is determined when an image decoding apparatus splits a first coding unit, satisfies a certain condition, according to an embodiment.

According to an embodiment, the image decoding apparatus 100 may determine to split a square first coding unit 1000 into non-square second coding units 1010*a*, and 1010*b* or 1020*a* and 1020*b*, based on split shape mode information, which is obtained by the receiver 110. The second coding units 1010*a* and 1010*b* or 1020*a* and 1020*b* may be independently split. As such, the image decoding apparatus 100 may determine to split or not to split each of the second coding units 1010*a* and 1010*b* or 1020*a* and 1020*b* into a plurality of coding units, based on the split shape mode information of each of the second coding units 1010*a* and 1010*b* or 1020*a* and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* to not be split in a horizontal direction in which the left second coding unit 1010*a* is split. When third coding units 1014*a* and 1014*b* are determined by splitting the right second coding unit 1010*b* in the same direction, because the left and right second coding units 1010*a* and 1010*b* are independently split in a horizontal direction, the third coding units 1012*a* and 1012*b* or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an embodiment, the image decoding apparatus 100 may determine third coding units 1022*a* and 1022*b* or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) to not be split in a vertical direction in which the upper second coding unit 1020*a* is split.

Figure 11:
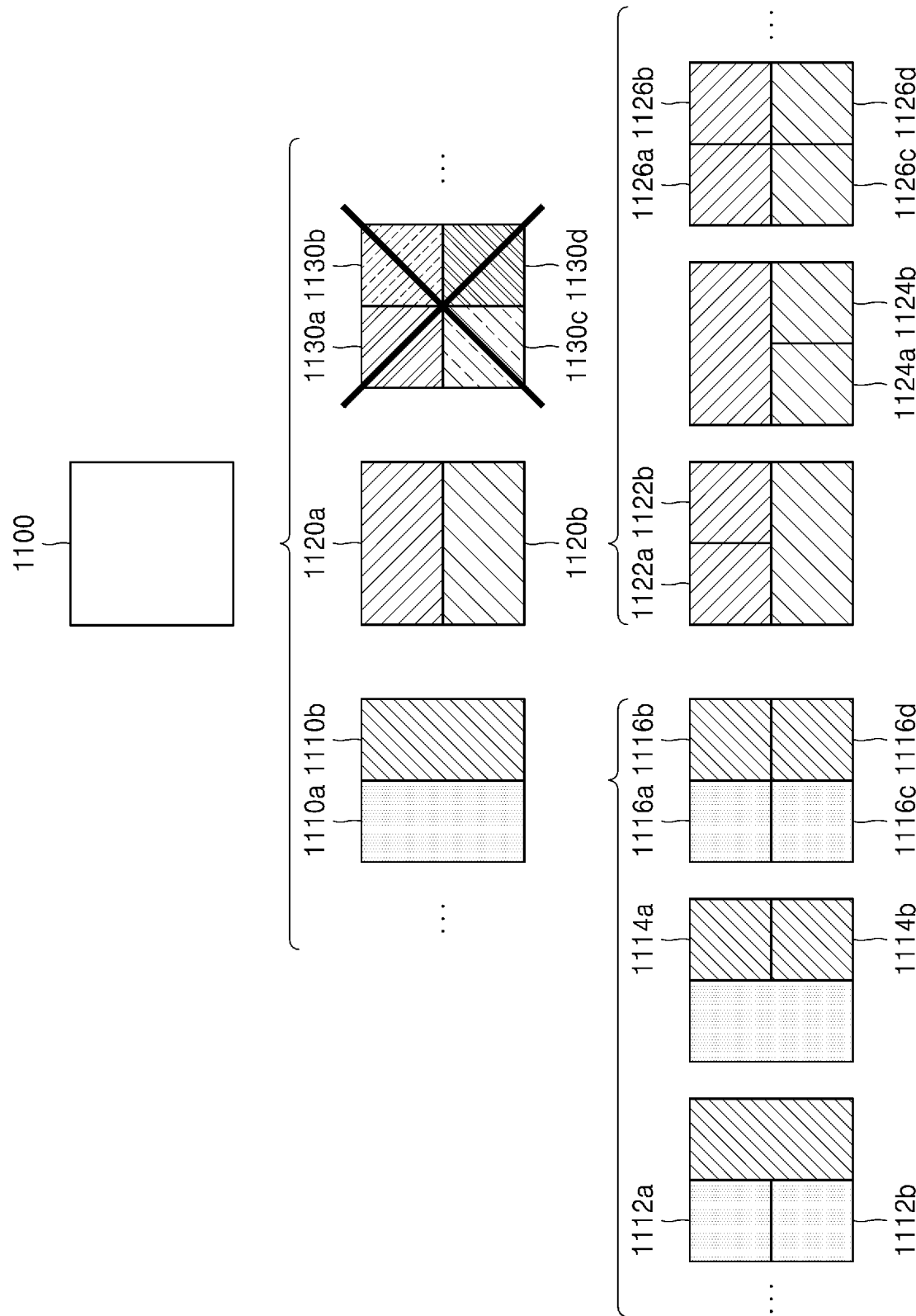
FIG. 11 illustrates a process by which an image decoding apparatus splits a square coding unit when split shape mode information is unable to indicate that the square coding unit is split into four square coding units, according to an embodiment.

FIG. 11 illustrates a process by which an image decoding apparatus splits a square coding unit when split shape mode information is unable to indicate that the square coding unit is split into four square coding units, according to an embodiment.

According to an embodiment, the image decoding apparatus 100 may determine second coding units 1110*a* and 1110*b* or 1120*a* and 1120*b*, etc. by splitting a first coding unit 1100, based on split shape mode information. The split shape mode information may include information on various methods of splitting a coding unit but, the information on various splitting methods may not include information for splitting a coding unit into four square coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b* or 1120*a* and 1120*b*, etc., based on the split shape mode information.

According to an embodiment, the image decoding apparatus 100 may independently split the non-square second coding units 1110*a* and 1110*b* or 1120*a* and 1120*b*, etc. Each of the second coding units 1110*a* and 1110*b* or 1120*a* and 1120*b*, etc. may be recursively split in a certain order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

In another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
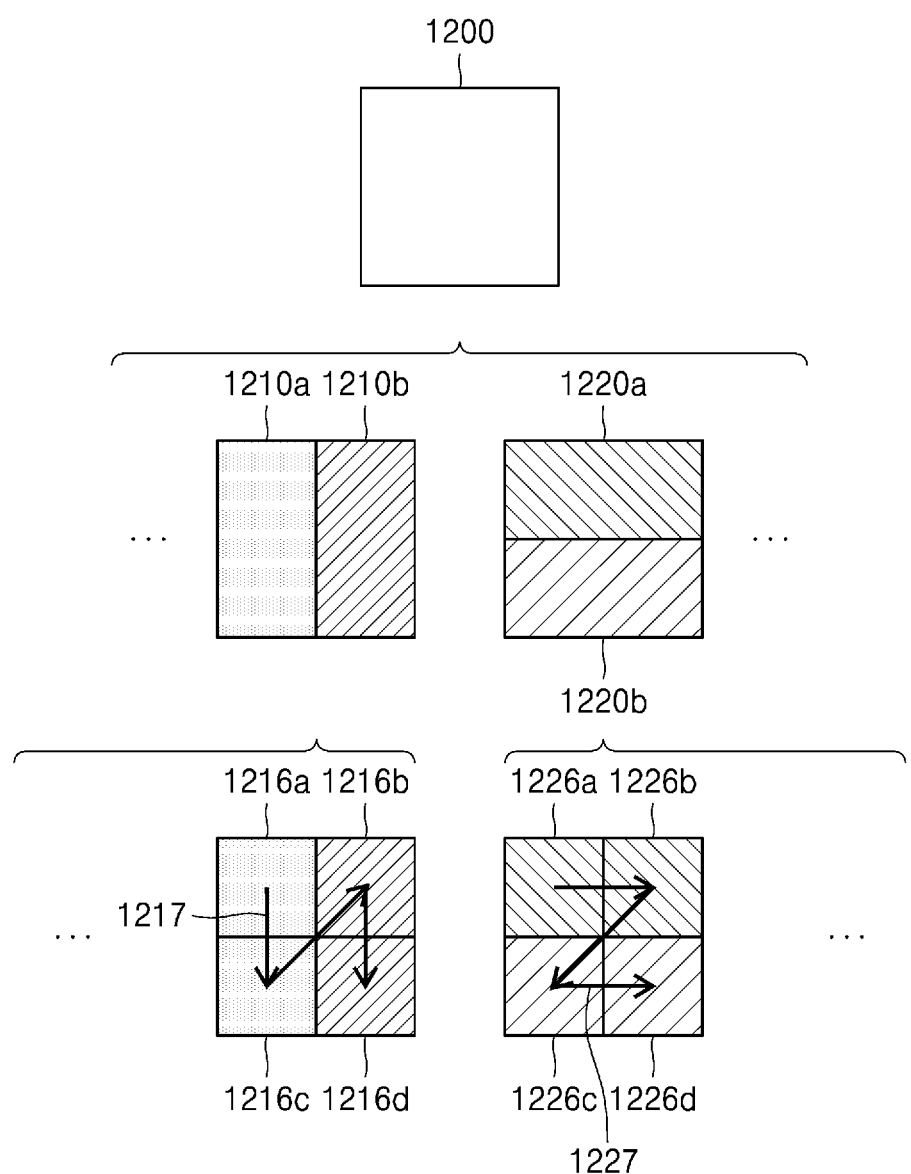
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape is a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a and 1210b or 1220a and 1220b has been described above in relation to FIG. 11, and thus detailed descriptions thereof will not be provided herein.

According to an embodiment, the image decoding apparatus 100 may process coding units in a certain order. An operation of processing coding units in a certain order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1920b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit when a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that a size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
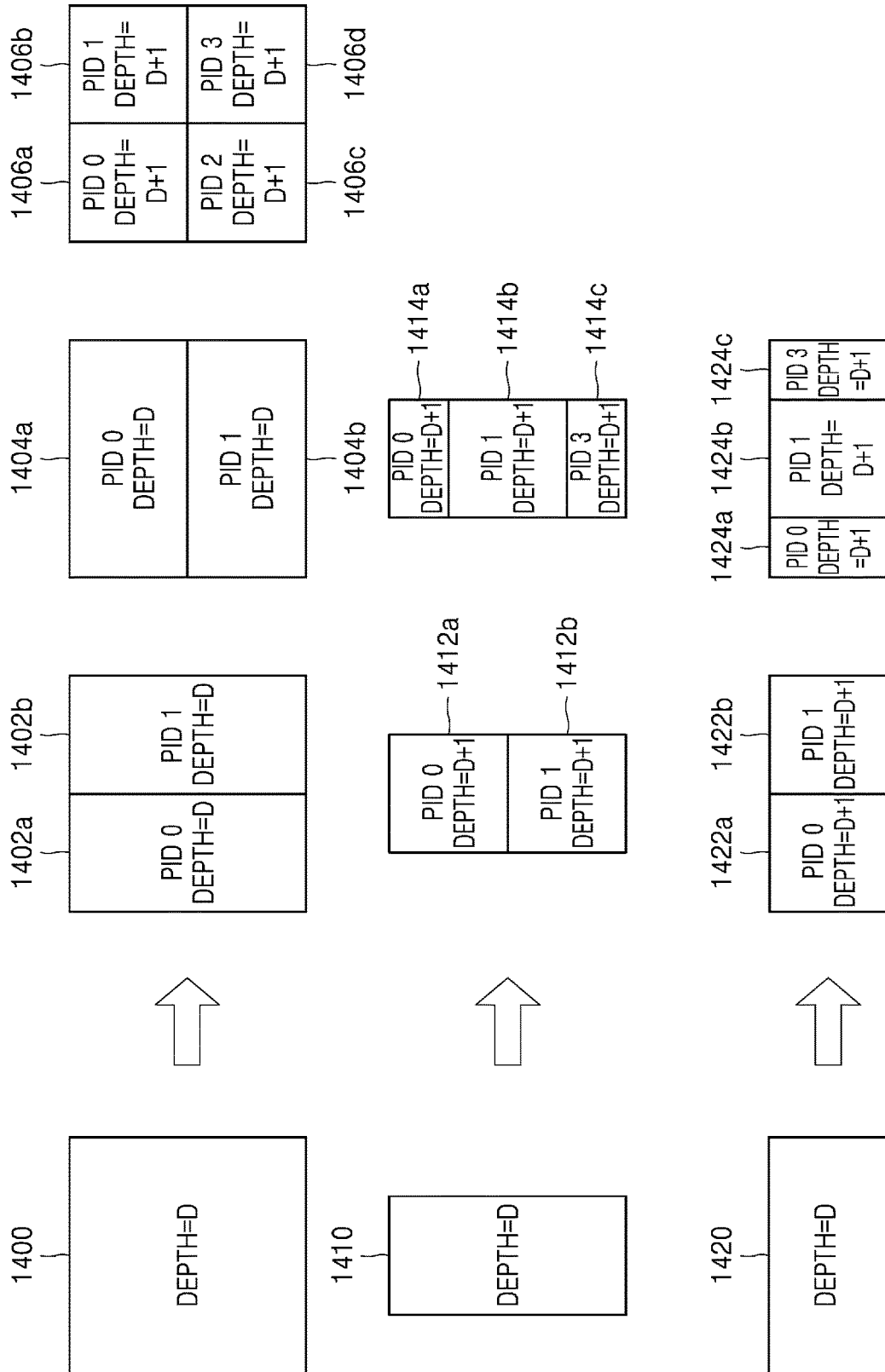
FIG. 14 illustrates depths that are determinable based on shapes and sizes of coding units, and part indexes (PIDs) for distinguishing the coding units, according to an embodiment.

FIG. 14 illustrates depths that are determinable based on shapes and sizes of coding units, and part indexes (PIDs) for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, the coding unit 1414*b* of a center location among the odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Accordingly, when a PID of the coding unit 1414*b* at the center location is 1 based on a scan order, a PID of the coding unit 1414*c* located next to the coding unit 1414*b* may be increased by 2 and thus may be 3. That is, discontinuity in PIDs may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PIDs for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
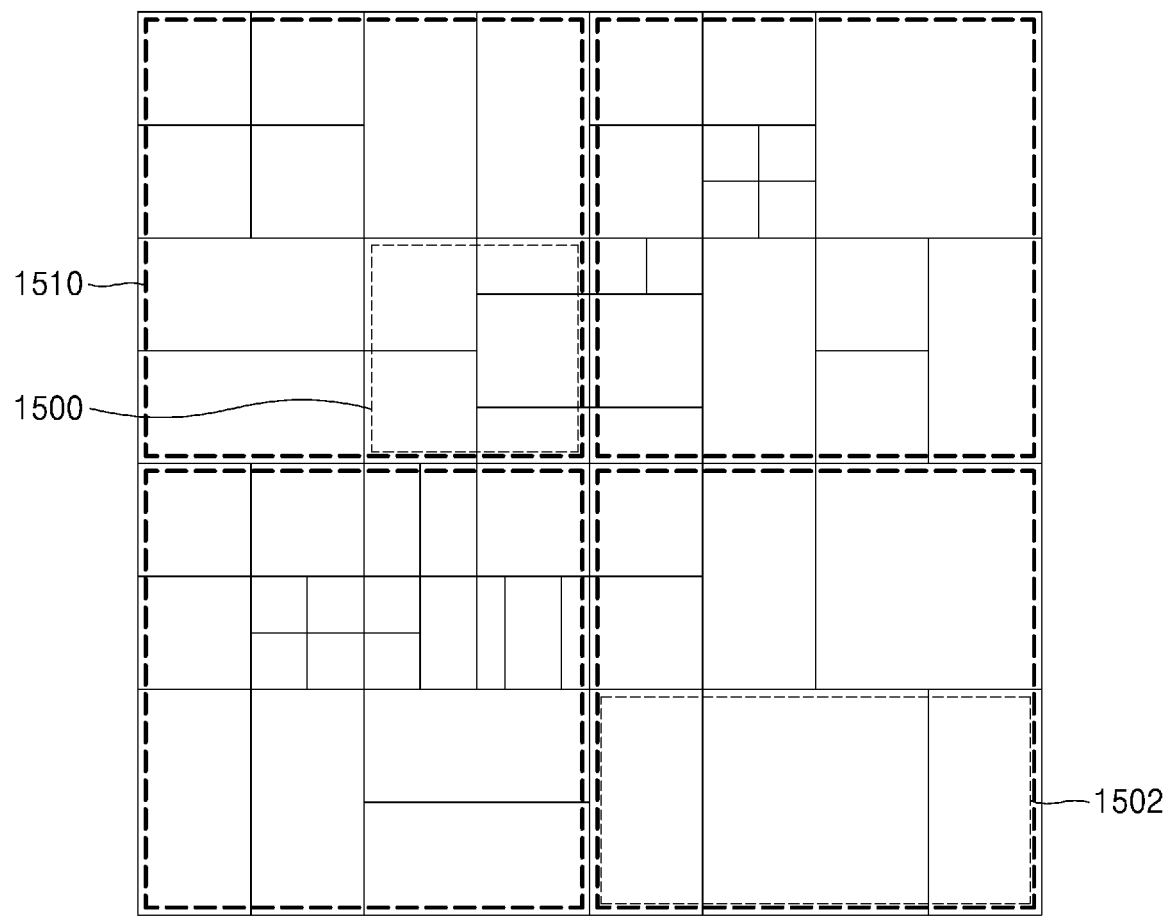
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of description, the certain data unit is referred to as a reference data unit.

According to an embodiment, the reference data unit may have a certain size and a certain shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quad-tree structure.

According to an embodiment, the image decoding apparatus 100 may previously determine a minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1510 or 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quad-tree structure. That is, the image decoding apparatus 100 may determine the reference coding units by splitting the largest coding unit n times based on a quad-tree structure, and may split the reference coding unit based on at least one of block shape information and split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule according to an embodiment of the present disclosure will be described in detail.

The image decoding apparatus 100 may determine a split rule of an image. The split rule may be pre-determined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image decoding apparatus 100 may pre-determine to determine the split rule based on the block shape of the coding unit. However, an embodiment is not limited thereto. The image decoding apparatus 100 may determine the split rule of the image, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, . . . , and 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, the direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding process orders. Because the decoding process orders have been described above with reference to FIG. 12, detailed descriptions thereof are not provided again.

Figure 16:
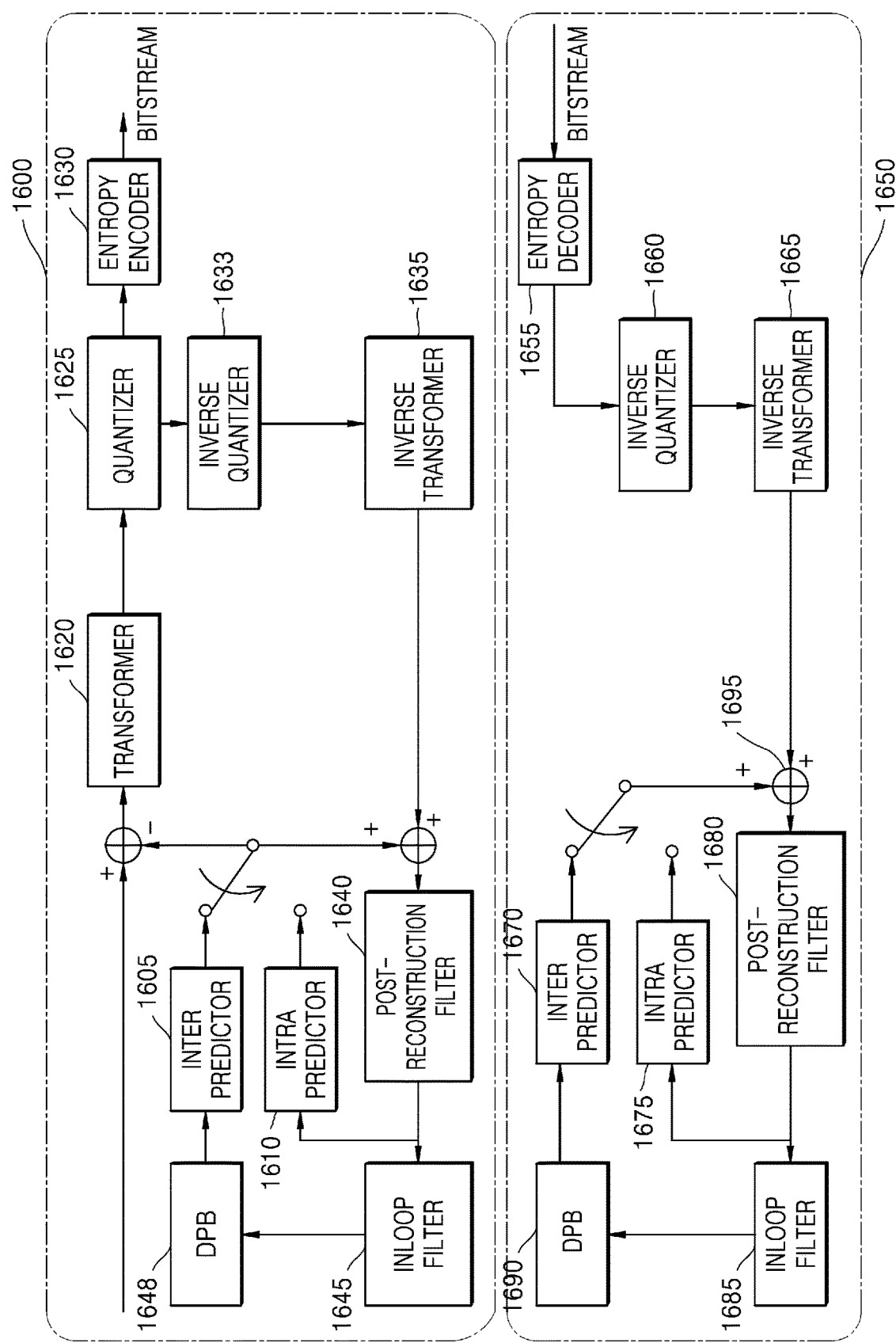
FIG. 16 is a block diagram of an image encoding and decoding system.

FIG. 16 is a block diagram of an image encoding and decoding system.

An encoder 1610 of an image encoding and decoding system 1600 transmits an encoded bitstream of an image, and a decoder 1650 receives and decodes the bitstream and outputs a reconstructed image. The decoder 1650 may have a configuration similar to that of the image decoding apparatus 100.

In the encoder 1610, when a prediction mode of a current block is an inter prediction mode, an inter predictor 1605 generates motion information of the current block indicating reference blocks of a reference picture temporally adjacent to a current picture. The inter predictor 1605 may generate prediction samples of the current block by using samples of the reference blocks. An intra predictor 1610 may determine intra prediction information indicating a direction in which neighboring samples similar to the current block are located or a method of determining prediction samples, so that the prediction samples of the current block are determined by using neighboring samples spatially adjacent to the current block. The inter predictor 1605 may determine reference samples to be used for prediction of the current block, from among previously reconstructed samples stored in a decoded picture buffer (DPB) 1648.

A transformer 1620 outputs transform coefficients, by performing transform on residual sample values obtained by subtracting the prediction samples generated by the inter predictor 1605 or the intra predictor 1610 from an original sample of the current block. A quantizer 1625 outputs quantized transform coefficients by quantizing the transform coefficients output from the transformer 1620. An entropy encoder 1630 may output a bitstream by encoding the quantized transform coefficients into residual syntax elements including a level value.

An inverse quantizer 1633 and an inverse transformer 1635 may inverse quantize and inverse transform the quantized transform coefficients output from the quantizer 1625 and may generate residual sample values again.

An adder 1615 outputs a reconstructed sample value obtained by adding the residual sample values to prediction sample values. A post-reconstruction filter 1640 may perform post-reconstruction filtering on reconstructed samples, and reconstructed sample values updated through the post-reconstruction filtering may be used as reference sample values for intra prediction to be performed by the intra predictor 1610. The post-reconstruction filter 1640 may perform Hadamard transform domain filtering or bilateral filtering on the reconstructed sample values.

An inloop filter 1645 may perform at least one of deblocking filtering and adaptive loop filtering on the reconstructed samples updated through the post-reconstruction filtering. The reconstructed sample values updated through filtering of the inloop filter 1645 may be stored in a DPB 1648, and may be used as reference sample values for inter prediction to be performed by the inter predictor 1605.

An entropy decoder 1655 of the decoder 1650 may perform entropy decoding on a received bitstream and may parse residual syntax elements including a level value. The entropy decoder 1655 may reconstruct quantized transform coefficients from the residual syntax elements. An inverse quantizer 1660 may output transform coefficients by performing inverse quantization on the quantized transform coefficients, and an inverse transformer 1665 may output residual sample values by performing inverse transform on the transform coefficients.

An inter predictor 1670 of the decoder 1650 may determine a reference picture temporally adjacent to a current picture by using motion information of a current block parsed by the entropy decoder 1655, and may determine reference blocks in the reference picture. The inter predictor 1670 may determine prediction samples of the current block by using samples of the reference blocks. An intra predictor 1675 of the decoder 1650 may determine reference samples spatially adjacent to the current block by using intra prediction information by using the motion information of the current block parsed by the entropy decoder 1655, and may determine prediction samples of the current block by using determined neighboring samples. The inter predictor 1670 may determine reference samples to be used for prediction of the current block, from among previously reconstructed samples stored in a DPB 1690.

An adder 1695 of the decoder 1650 outputs a reconstructed sample value obtained by adding the residual sample values to prediction sample values. A post-reconstruction filter 1680 of the decoder 1650 may perform Hadamard transform domain filtering or bilateral filtering on reconstructed sample values. Reconstructed sample values updated through filtering of the post-reconstruction filter 1680 may be used as reference sample values for intra prediction to be performed by the intra predictor 1675.

An inloop filter 1685 of the decoder 1650 may perform at least one of deblocking filtering and adaptive loop filtering on the reconstructed samples updated through the post-reconstruction filtering. The reconstructed sample values updated through filtering of the inloop filter 1685 may be stored in the DPB 1690, and may be used as reference sample values for inter prediction to be performed by the inter predictor 1670.

A video encoding method and decoding method, and a video encoding apparatus and decoding apparatus according to an embodiment propose a method of performing prediction based on an affine model by considering a coding order of coding units. Hereinafter, a method and apparatus for encoding or decoding a video by performing post-reconstruction filtering according to an embodiment of the present disclosure will be described in detail with reference to FIGS. 17 through 28.

Hereinafter, the term 'maximum size of a coding unit' refers to a maximum size of a large side from among a width and a height of the coding unit, and the term 'minimum size of a coding unit' refers to a minimum size of a large side from among a width and a height of the coding unit.

Hereinafter, the term 'tree structure' may refer to a hierarchical structure of one or more coding units formed according to whether a split mode of a coding unit is a quad-split mode, a binary split mode, a ternary split mode, and a non-split mode. For example, a hierarchical structure of blocks generated from a current coding unit according to a splitting process of FIG. 5 is referred to as a tree structure.

Hereinafter, the term 'availability of a block' refers to whether the block is already encoded or decoded and information of the block is obtainable. In detail, when a current block is already encoded in an encoding process, a neighboring block may be encoded by using encoding information of the current block, and thus the current block may be marked as available. When a current block is not encoded, the current block may be marked as unavailable. Likewise, when a current block is already decoded in a decoding process, because a neighboring block may be decoded by using encoding information of the current block, the current block may be marked as available. When the current block is not decoded, the current block may be marked as unavailable.

Hereinafter, the term 'availability of motion information of a block' refers to whether motion prediction (prediction other than prediction according to an intra mode or an intra block copy mode) is performed on the block and motion information (a motion vector, a prediction direction (L0-pred, L1-pred or Bi-pred), and a reference picture index) of the block is obtainable. In detail, when motion prediction is already performed on a current block in an encoding process and there is motion information of the current block, motion prediction of a neighboring block may be performed by using the motion information of the current block, and thus the motion information of the current block may be marked as available. When motion prediction is not performed on a current block in an encoding process, motion information of the current block may be marked as unavailable. Likewise, when motion prediction is already performed on a current block in a decoding process and there is motion information of the current block, motion prediction of a neighboring block may be performed by using the motion information of the current block, and thus the motion information of the current block may be marked as available. When motion prediction is not performed on a current block in a decoding process, motion information of the current block may be marked as unavailable.

Figure 17:
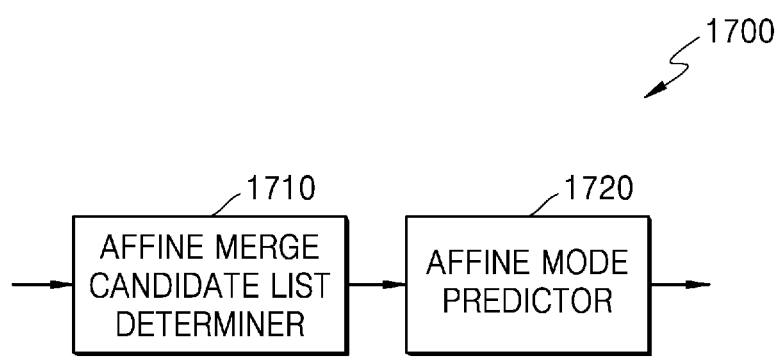
FIG. 17 is a block diagram of a video decoding apparatus according to an embodiment.

Hereinafter, the term 'affine merge candidate' may correspond to control point vectors corresponding to a neighboring block of a current block or a block group. Because control point vectors are determined from a motion vector of a neighboring block or control point vectors are determined based on motion vectors of neighboring blocks belonging to a block group, each control point vector may correspond to the neighboring block or the block group. Accordingly, in the present specification, for convenience of description, the term 'affine merge candidate' may correspond to control point vectors determined from a neighboring block or a block group, or may correspond to a neighboring block or a block group, and there is no difference in the meaning of the two expressions. FIG. 17 is a block diagram of a video decoding apparatus according to an embodiment.

Referring to FIG. 17, a video decoding apparatus 1700 according to an embodiment may include an affine merge candidate list determiner 1710 and an affine mode predictor 1720.

The video decoding apparatus 1700 may obtain a bitstream generated as a result of image encoding, may recognize locations of blocks split from a picture based on information included in the bitstream, and may decode blocks such as a largest coding unit and a coding unit.

The video decoding apparatus 1700 according to an embodiment may include a central processor (not shown) for controlling the affine merge candidate list determiner 1710 and the affine mode predictor 1720. Alternatively, the affine merge candidate list determiner 1710 and the affine mode predictor 1720 may be operated by their own processors (not shown) thereof, and the processors (not shown) may systemically operate with each other to operate the video decoding apparatus 1700. Alternatively, the affine merge candidate list determiner 1710 and the affine mode predictor 1720 may be controlled under the control of an external processor (not shown) of the video decoding apparatus 1700.

The video decoding apparatus 1700 may include one or more data storages (not shown) in which input/output data of the affine merge candidate list determiner 1710 and the affine mode predictor 1720 are stored. The video decoding apparatus 1700 may include a memory controller (not shown) for controlling data input and output of the data storages (not shown).

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 according to an embodiment may perform a basic image decoding operation in a manner that not only a separate processor but also an image decoding processing module included in a central processing apparatus or a graphic processing apparatus perform the basic image decoding operation.

The video decoding apparatus 1700 may be included in the image decoding apparatus 100. For example, the affine merge candidate list determiner 1710 and the affine mode predictor 1720 may respectively correspond to the receiver 110 and the decoder 120 of the image decoding apparatus 100. The video decoding apparatus 1700 may correspond to the decoder 1650 of the image encoding and decoding system described with reference to FIG. 16. For example, the affine merge candidate list determiner 1710 and the affine mode predictor 1720 may respectively correspond to the entropy decoder 1655 and the inter predictor 1670 of the decoder 1650.

The video decoding apparatus 1700 receives a bitstream generated as a result of image encoding. The bitstream may include information on a current picture. The picture may include one or more largest coding units. The video decoding apparatus 1700 may determine a location of a current block in the picture based on the information obtained from the bitstream. The current block that is a block generated by being split from the picture according to a tree structure may correspond to, for example, a largest coding unit or a coding unit. The video decoding apparatus 1700 may determine whether the current block is to be further split into sub-blocks of a lower depth, and may determine a tree structure of the current block. Compared to a current depth of the current block, the lower depth may be determined by increasing a depth by the number of times splitting is performed from the current block to the sub-blocks. Blocks located in tree leaves from among blocks constituting the tree structure included in the current picture are no longer split. Accordingly, the video decoding apparatus 1700 may perform inverse quantization, inverse transform, and prediction on one or more blocks that are no longer split to decode the blocks.

The video decoding apparatus 1700 may generate prediction samples of the current block by performing prediction on the current block. The video decoding apparatus 1700 may generate residual samples of the current block by performing inverse transform on the current block. A reconstructor 1920 may generate reconstructed samples of the current block by using the prediction samples of the current block and the residual samples of the current block. The video decoding apparatus 1700 may reconstruct the current picture by reconstructing samples for each block.

For example, when a prediction mode of the current block is an intra mode, the video decoding apparatus 1700 may determine a reference sample from among samples of a spatial neighboring block located in an intra prediction direction by using intra prediction information of the current block, and may determine prediction samples corresponding to the current block by using the reference sample.

For example, when a prediction mode of the current block is an inter mode, the video decoding apparatus 1700 may reconstruct the current block by using a motion vector of the current block. The video decoding apparatus 1700 may determine a reference block in a reference picture by using the motion vector of the current block, and may determine prediction samples corresponding to the current block from reference samples included in the reference block. The video decoding apparatus 1700 may reconstruct transform coefficients by using a transform coefficient level obtained from a bitstream, and may reconstruct residual samples by performing inverse quantization and inverse transform on the transform coefficients. The video decoding apparatus 1700 may determine reconstructed samples of the current block by combining the prediction samples corresponding to the current block and the residual samples.

When the current block is predicted in a skip mode, the video decoding apparatus 1700 does not need to parse transform coefficients of the current block from a bitstream. The video decoding apparatus 1700 may determine reconstructed samples of the current block by using prediction samples of the current block.

In particular, when affine model-based inter prediction is performed on the current block, the affine merge candidate list determiner 1710 may be invoked. The video decoding apparatus 1700 according to an embodiment may obtain a merge mode flag indicating whether an inter prediction mode of the current block is a merge mode from a bitstream, and when the merge mode flag indicates the merge mode, the video decoding apparatus 1700 may obtain, from the bitstream, an affine flag indicating whether motion compensation based on an affine model is performed to generate a prediction sample of the current block. When the affine flag indicates that motion compensation based on the affine model is performed, the video decoding apparatus 1700 according to an embodiment may invoke the affine merge candidate list determiner 1710, and the affine merge candidate list determiner 1710 according to an embodiment may generate an affine merge candidate list including a control point-based affine merge candidate corresponding to control point motion vectors determined by using motion vectors of neighboring blocks included in a block group of representative neighboring blocks according to corners of the current block.

In detail, when inter prediction of a current block is performed in an affine merge mode, before a control point-based affine merge candidate is configured, the affine merge candidate list determiner 1710 according to an embodiment may generate an affine merge candidate list including a model-based affine merge candidate. The model-based affine merge candidate is a merge candidate corresponding to control point motion vectors determined according to an affine motion vector of an available neighboring block from among neighboring blocks at a certain location adjacent to the current block. That is, neighboring blocks that are decoded before the current block may be determined as model-based affine merge candidates. When motion information of a neighboring block is available, a model-based affine merge candidate corresponding to the neighboring block is also set as available. In contrast, when motion information of a neighboring block is not available, a model-based affine merge candidate corresponding to the neighboring block is also set as unavailable. However, when the number of available model-based affine merge candidates is less than a certain number, the affine merge candidate list determiner 1710 may determine a control point-based affine merge candidate corresponding to a group of representative neighboring blocks according to corners of the current block, and may add the control point-based affine merge candidate to an affine merge candidate list. The certain number is a maximum number of affine merge candidates that are allowed to be included in the affine merge candidate list, and may be set to, for example, 5.

Accordingly, a model-based affine merge candidate may be a corresponding merge candidate derived from one neighboring block, and a control point-based affine merge candidate may be a merge candidate derived from a combination of affine models of two or more neighboring blocks. An available model-based affine merge candidate may be included in an affine merge candidate list of a current block, and when the number of valid affine merge candidates of the current block is less than a certain number, control point-based affine merge candidates as many as the insufficient number of affine merge candidates may be added to the affine merge candidate list.

The affine mode predictor 1720 according to an embodiment may determine an affine motion vector of the current block by using control point motion vectors corresponding to a merge candidate selected from the affine merge candidate list. By using an affine merge index obtained from a bitstream, the affine mode predictor 1720 may determine a control point motion vector of a merge candidate indicated by the affine merge index from the affine merge candidate list. The affine mode predictor 1720 may determine an affine motion model parameter of the current block by using the control point motion vector, and may determine an affine motion vector of the current block by using the affine motion model parameter of the current block. The affine mode predictor 1720 may obtain prediction samples of the current block, by using a reference sample indicated by the affine motion vector of the current block.

When a model-based affine merge candidate is selected from the affine merge candidate list, control point motion vectors corresponding to the model-based affine merge candidate may be determined by using an affine model of one neighboring block, and the affine mode predictor 1720 according to an embodiment may determine an affine motion vector of the current block by using the control point motion vectors corresponding to the model-based affine merge candidate.

When a control point-based affine merge candidate is selected from the affine merge candidate list, control point motion vectors corresponding to the control point-based affine merge candidate may be determined by using control points of the current block or neighboring blocks included in a corresponding block group, and the affine mode predictor 1720 according to an embodiment may determine an affine motion vector of the current block by using the control point motion vectors corresponding to the control point-based affine merge candidate.

In detail, when a model-based affine merge candidate is selected from the affine merge candidate list, control point motion vectors corresponding to control points of the current block may be determined by using a vertical change amount, a horizontal change amount, and a motion vector of one neighboring block corresponding to the model-based affine merge candidate. In more detail, a reference index, a prediction direction, and a control point motion vector corresponding to the model-based affine merge candidate may be respectively determined, by using a reference index, a prediction direction (L0-pred, L1-pred, or Bi-pred), and a motion vector of a neighboring block. A reference index, a prediction direction, and an affine motion vector of the current block may be respectively determined by using the reference index, the prediction direction, and the control point motion vector corresponding to the affine merge candidate.

In detail, when a control point-based affine merge candidate is selected from the affine merge candidate list, control point motion vectors may be determined by using motion vectors of neighboring blocks adjacent to control points of the current block, and an affine motion vector of the current block may be determined by using the control point motion vectors according to the selected affine merge candidate. In more detail, a reference index, a prediction direction, and a control point motion vector corresponding to an affine merge candidate may be respectively determined by using a reference index, a prediction direction, and a motion vector of representative neighboring blocks belonging to a block group. A reference index, a prediction direction, and an affine motion vector of the current block may be respectively determined by using the reference index, the prediction direction, and the control point motion vector corresponding to the affine merge candidate.

The video decoding apparatus 1700 according to an embodiment may change a coding order between laterally adjacent coding units according to a split unit coding order (SUCO) method. For example, the video decoding apparatus 1700 may obtain a coding order flag indicating a direction of a coding order from a bitstream. When the coding order flag indicates a left-to-right direction, from among laterally adjacent sub-coding units generated by being split from a current coding unit, a left sub-coding unit may be first decoded, and then a right sub-coding unit may be decoded. When the coding order flag indicates a right-to-left direction, a right sub-coding unit may be first decoded, and then a left sub-coding unit may be decoded.

For example, when a right block of a current block is initially decoded and is available, a representative neighboring block adjacent to a lower right corner of the current block may be determined to be a neighboring block whose available motion information is obtained, from among a neighboring block adjacent to the lower right corner of the current block and a right boundary of the current block and a neighboring block diagonally adjacent to the lower right corner of the current block. Whether available motion information of a block is obtained in an order of a neighboring block C1 and a neighboring block C0 may be checked, and an initially available block may be determined as a BR representative neighboring block.

However, when the right block of the current block is not available, a representative neighboring block adjacent to the lower right corner of the current block may be a collocated block located at a point diagonally adjacent to the lower right corner of the current block. The collocated block is a block included in a collocated picture and may be included as a temporal merge candidate in an affine merge candidate list.

In another example, when a right block of a current block is previously decoded and is available, a BR representative neighboring block adjacent to a lower right corner of the current block may be determined to be a block whose motion information is initially available from among a neighboring block C1 adjacent to the lower right corner of the current block and a right boundary of the current block, a neighboring block C0 diagonally adjacent to the lower right corner of the current block, and a collocated block Col located at a point diagonally adjacent to the lower right corner of the current block. Whether available motion information of a block is obtained in an order of the neighboring block C1, the neighboring block C0, and the collocated block Col may be checked, and an initially available block may be determined as a BR representative neighboring block.

The collocated block is a block included in a collocated picture and may be included as a temporal merge candidate in an affine merge candidate list. The collocated block adjacent to the lower right corner of the current block may be a block located at a coordinate corresponding to the lower right corner of the current block in the collocated picture.

The video decoding apparatus 1700 according to an embodiment needs to check availability of motion information of a neighboring block in order to include a valid merge candidate in an affine merge candidate list. This is because a valid merge candidate may be determined from a neighboring block on which motion prediction is performed and that has available motion information. In general, a neighboring block on which motion prediction has been performed before a current block is available for prediction of the current block. In detail, when motion prediction has been performed on a left neighboring block of a current block before the current block, motion information of the left neighboring block is available. When motion prediction has been performed on a right neighboring block of a current block before the current block, motion information of the right neighboring block is available. In contrast, when motion prediction has not been performed on a left neighboring block of a current block, motion information of the left neighboring block is unavailable. When motion prediction has not been performed on a right neighboring block of a current block, motion information of the right neighboring block is unavailable.

Because right neighboring blocks, instead of left neighboring blocks of a neighboring block, may be initially decoded according to a coding order, the video decoding apparatus 1700 according to an embodiment needs to determine an affine merge candidate list by considering the coding order.

Hereinafter, a video decoding method of performing affine model-based prediction by generating an affine merge candidate list by considering a coding order will be described in detail with reference to FIG. 18.

Figure 18:
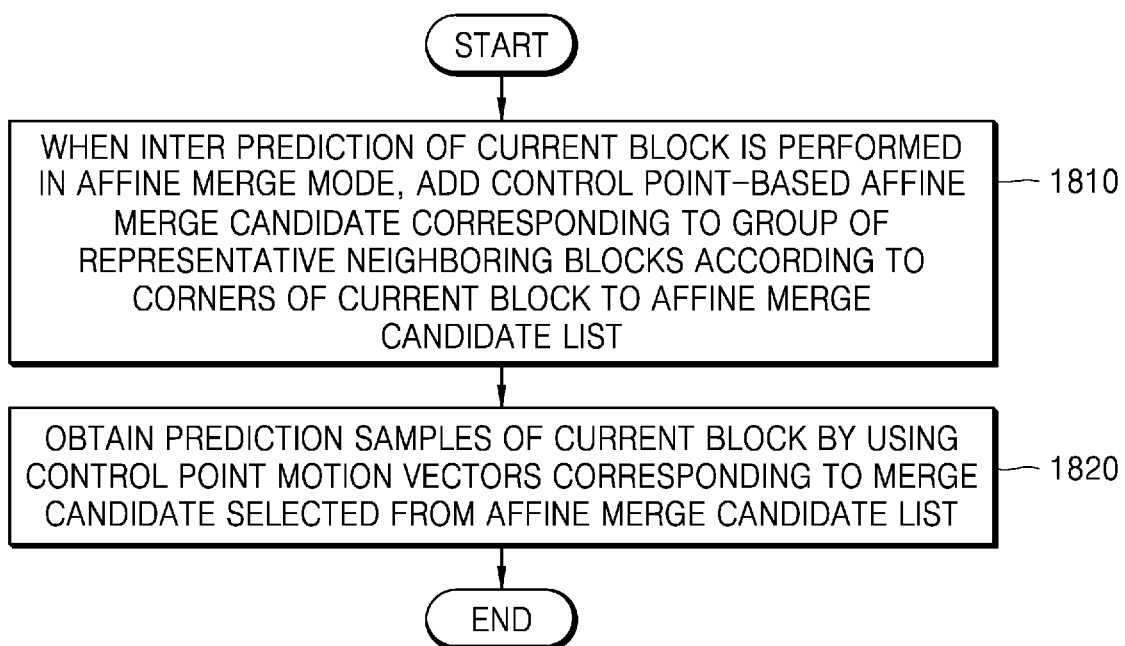
FIG. 18 is a flowchart of a video decoding method according to an embodiment.

FIG. 18 is a flowchart of a video decoding method according to an embodiment.

In operation 1810, when inter prediction of a current block is performed in an affine merge mode, the affine merge candidate list determiner 1710 according to an embodiment may generate an affine merge candidate list including a control point-based affine merge candidate corresponding to control point motion vectors determined by using motion vectors of neighboring blocks included in a block group of representative neighboring blocks according to corners of the current block.

In particular, when a right block of the current block is available, a representative neighboring block adjacent to a lower right corner of the current block may be determined to be a block whose available motion information is obtained from among a neighboring block adjacent to the lower right corner of the current block and a right boundary of the current block and a neighboring block diagonally adjacent to the lower right corner of the current block. However, when the right block of the current block is not available, a representative neighboring block adjacent to the lower right corner of the current block may be a collocated block located at a point diagonally adjacent to the lower right corner of the current block.

In detail, the affine merge candidate list determiner 1710 according to an embodiment may determine availability of motion information of a first representative neighboring block adjacent to an upper left corner of the current block, availability of motion information of a second representative neighboring block adjacent to an upper right corner of the current block, availability of motion information of a third representative neighboring block adjacent to a lower left corner of the current block, and availability of motion information of a fourth representative neighboring block adjacent to a lower right corner of the current block.

The affine merge candidate list determiner 1710 according to an embodiment may determine a control point-based affine merge candidate corresponding to a block group including a plurality of representative neighboring blocks, based on availability of at least one of the motion information of the first representative neighboring block, the motion information of the second representative neighboring block, the motion information of the third representative neighboring block, and the motion information of the fourth representative neighboring block.

For example, the affine merge candidate list determiner 1710 may determine six control point-based affine merge candidates. Groups of representative neighboring blocks corresponding to the control point-based affine merge candidates may be different from one another. The affine merge candidate list determiner 1710 may include only available candidates, from among the control point-based affine merge candidates, in the affine merge candidate list.

The affine merge candidate list determiner 1710 according to an embodiment may determine a first control point-based affine merge candidate corresponding to a block group including a first representative neighboring block, a second representative neighboring block, and a third representative neighboring block. In detail, when availability of motion information of the first representative neighboring block adjacent to an upper left corner of a current block, availability of motion information of the second representative neighboring block adjacent to an upper right corner of the current block, and availability of motion information of the third representative neighboring block adjacent to a lower left corner of the current block, respectively, indicate available, the affine merge candidate list determiner 1710 may determine that the first control point-based affine merge candidate corresponding to the block group including the first representative neighboring block, the second representative neighboring block, and the third representative neighboring block is available. When any of the motion information of the first representative neighboring block, the motion information of the second representative neighboring block, and the motion information of the third representative neighboring block is not available, the first control point-based affine merge candidate may be set as unavailable.

The affine merge candidate list determiner 1710 according to an embodiment may determine a second control point-based affine merge candidate corresponding to a block group including a first representative neighboring block, a second representative neighboring block, and a fourth representative neighboring block. In detail, when availability of motion information of the first representative neighboring block adjacent to an upper left corner of a current block, availability of motion information of the second representative neighboring block adjacent to an upper right corner of the current block, and availability of motion information of the fourth representative neighboring block adjacent to a lower right corner of the current block, respectively, indicate available, the affine merge candidate list determiner 1710 may determine that the second control point-based affine merge candidate corresponding to the block group including the first representative neighboring block, the second representative neighboring block, and the fourth representative neighboring block is available. When any of the motion information of the first representative neighboring block, the motion information of the second representative neighboring block, and the motion information of the fourth representative neighboring block is not available, the second control point-based affine merge candidate may be set as unavailable.

The affine merge candidate list determiner 1710 according to an embodiment may determine a third control point-based affine merge candidate corresponding to a first representative neighboring block, a third representative neighboring block, and a fourth representative neighboring block. In detail, when availability of motion information of the first representative neighboring block adjacent to an upper left corner of a current block, availability of motion information of the third representative neighboring block adjacent to a lower left corner of the current block, and availability of motion information of the fourth representative neighboring block adjacent to a lower right corner of the current block, respectively, indicate available, the affine merge candidate list determiner 1710 may determine that the third control point-based affine merge candidate corresponding to the block group including the first representative neighboring block, the third representative neighboring block, and the fourth representative neighboring block is available. When any of the motion information of the first representative neighboring block, the motion information of the third representative neighboring block, and the motion information of the fourth representative neighboring block is not available, the third control point-based affine merge candidate may be set as unavailable.

The affine merge candidate list determiner 1710 according to an embodiment may determine a fourth control point-based affine merge candidate corresponding to a block group including a second representative neighboring block, a third representative neighboring block, and a fourth representative neighboring block. In detail, when availability of motion information of the second representative neighboring block adjacent to an upper right corner of a current block, availability of motion information of the third representative neighboring block adjacent to a lower left corner of the current block, and availability of motion information of the fourth representative neighboring block adjacent to a lower right corner of the current block, respectively, indicate available, the affine merge candidate list determiner 1710 may determine that the fourth control point-based affine merge candidate corresponding to the block group including the second representative neighboring block, the third representative neighboring block, and the fourth representative neighboring block is available When any of the motion information of the second representative neighboring block, the motion information of the third representative neighboring block, and the motion information of the fourth representative neighboring block is not available, the fourth control point-based affine merge candidate may be set as unavailable.

The affine merge candidate list determiner 1710 according to an embodiment may determine a fifth control point-based affine merge candidate corresponding to a block group including a first representative neighboring block and a second representative neighboring block. In detail, when availability of motion information of the first representative neighboring block adjacent to an upper left corner of a current block and availability of motion information of the second representative neighboring block adjacent to an upper right corner of the current block, respectively, indicate available, the affine merge candidate list determiner 1710 may determine that the fifth control point-based affine merge candidate corresponding to the block group including the first representative neighboring block and the second representative neighboring block is available. When any of the motion information of the first representative neighboring block and the motion information of the second representative neighboring block is not available, the fifth control point-based affine merge candidate may be set as unavailable.

The affine merge candidate list determiner 1710 according to an embodiment may determine a sixth control point-based affine merge candidate corresponding to a block group including a first representative neighboring block and a third representative neighboring block. When availability of motion information of the first representative neighboring block adjacent to an upper left corner of a current block and availability of motion information of the third representative neighboring block adjacent to a lower left corner of the current block, respectively, indicate available, the affine merge candidate list determiner 1710 may determine that the sixth control point-based affine merge candidate corresponding to the block group including the first representative neighboring block and the third representative neighboring block is available. When any of the motion information of the first representative neighboring block and the motion information of the third representative neighboring block is not available, the sixth control point-based affine merge candidate may be set as unavailable.

According to an embodiment, a first representative neighboring block adjacent to an upper left corner of a current block may be determined to be a block having available motion information, from among a neighboring block diagonally adjacent to the upper left corner of the current block, a neighboring block adjacent to the upper left corner of the current block and an upper boundary of the current block, and a neighboring block adjacent to the upper left corner of the current block and a left boundary of the current block.

According to an embodiment, a second representative neighboring block adjacent to an upper right corner of a current block may be determined to be a block whose available motion information is obtained, from among a neighboring block diagonally adjacent to the upper right corner of the current block, a neighboring block adjacent to the upper right corner of the current block and an upper boundary of the current block, and a neighboring block adjacent to the upper right corner of the current block and a right boundary of the current block.

According to an embodiment, when a left block of a current block is available, a third representative neighboring block adjacent to a lower left corner of the current block may be determined to be a block whose available motion information is obtained, from among a neighboring block diagonally adjacent to the lower left corner of the current block and a neighboring block adjacent to the lower left corner of the current block and a left boundary of the current block. However, when the left block of the current block is not available, the third representative neighboring block may be a collocated block located at a point diagonally adjacent to the lower left corner of the current block. The collocated block adjacent to the lower left corner of the current block may be a block located at a coordinate corresponding to the lower left corner of the current block in a collocated picture.

According to an embodiment, when a right block of a current block is available, a fourth representative neighboring block adjacent to a lower right corner of a current block may be determined to be a block whose available motion information is obtained, from among a neighboring block adjacent to the lower right corner of the current block and a right boundary of the current block and a neighboring block diagonally adjacent to the lower right corner of the current block. However, when the right block of the current block is not available, the fourth representative neighboring block may be a collocated block located at a point diagonally adjacent to the lower right corner of the current block.

In operation 1820, the affine mode predictor 1720 according to an embodiment may determine an affine motion vector of the current block by using control point motion vectors corresponding to a merge candidate selected from the affine merge candidate list, and may obtain prediction samples of the current block by using the affine motion vector of the current block.

When interpolation filtering is performed to determine a reference sample by using a motion vector generated according to affine prediction, an affine motion model parameter is required. The affine motion model parameter may include a horizontal change amount of the motion vector, a vertical change amount of the motion vector, and a base motion vector. The affine motion model parameter may be determined from control point motion vectors. The affine mode predictor 1720 according to an embodiment may determine the affine motion vector of the current block by using a horizontal change amount of a motion vector, a vertical change amount of the motion vector, and a base motion vector, and may obtain prediction samples of the current block by using samples of a reference block indicated by the affine motion vector of the current block.

When a control point-based affine merge candidate is selected from the affine merge candidate list, the affine mode predictor 1720 according to an embodiment may determine control point motion vectors by using a motion vector of representative neighboring blocks adjacent to corners of the current block belonging to a group of neighboring blocks corresponding to the control point-based affine merge candidate.

First, control point motion information (a motion vector, a prediction direction, and a reference picture index) may be determined, by using motion information (a motion vector, a prediction direction, and a reference index) of a representative neighboring block, according to an upper left control point, an upper right control point, a lower left control point, and a lower right control point of the current block.

Control point motion information of the upper left control point may be determined, by using motion information of a representative neighboring block (first representative neighboring block) from among neighboring blocks of the upper left control point. Control point motion information of the upper right control point may be determined, by using motion information of a representative neighboring block (second representative neighboring block) from among neighboring blocks of the upper right control point. Control point motion information of the lower left control point may be determined, by using motion information of a representative neighboring block (third representative neighboring block) from among neighboring blocks of the lower left control point. Control point motion information of the lower right control point may be determined, by using motion information of a representative neighboring block (fourth representative neighboring block) from among neighboring blocks of the lower right control point.

Next, by using control point motion information of control points belonging to an affine merge candidate, that is, a representative neighboring block adjacent to corners of the current block belonging to a group of neighboring blocks corresponding to a control point-based affine merge candidate, pieces of control point motion information corresponding to the affine merge candidate may be determined.

For example, when a first control point-based affine merge candidate is selected from among affine control point merge candidates, a control point motion vector of a first representative neighboring block, a control point motion vector of a second representative neighboring block, and a control point motion vector of a third representative neighboring block belonging to a second control point-based affine merge candidate may be respectively determined as first, second, and third control point motion vectors corresponding to a first affine merge candidate.

For example, when a second control point-based affine merge candidate is selected from among affine control point merge candidates, a control point motion vector of a first representative neighboring block and a control point motion vector of a second representative neighboring block belonging to the second control point-based affine merge candidate may be respectively determined as a first control point motion vector and a second control motion vector corresponding to the second control point-based affine merge candidate, and a third control point motion vector corresponding to the second control point-based affine merge candidate may be determined by using the control point motion vector of the first representative neighboring block, the control point motion vector of the second representative neighboring block, and a control point motion vector of a fourth representative neighboring block.

For example, when a third control point-based affine merge candidate is selected from among affine control point merge candidates, a control point motion vector of a first representative neighboring block and a control point motion vector of a third representative neighboring block belonging to the third control point-based affine merge candidate may be respectively determined as a first control point motion vector and a third control motion vector corresponding to the third control point-based affine merge candidate, and a second control point motion vector corresponding to the third control point motion vector may be determined by using the control point motion vector of the first representative neighboring block, the control point motion vector of the third representative neighboring block, and a control point motion vector of a fourth representative neighboring block.

For example, when a fourth control point-based affine merge candidate is selected from among affine control point merge candidates, a control point motion vector of a second representative neighboring block and a control point motion vector of a third representative neighboring block belonging to the fourth control point-based affine merge candidate may be respectively determined as a second control point motion vector and a third control motion vector corresponding to the fourth control point-based affine merge candidate, and a first control point motion vector corresponding to the fourth control point-based affine merge candidate may be determined by using the control point motion vector of the second representative neighboring block, the motion vector of the third representative neighboring block, and a motion vector of a fourth representative neighboring block.

For example, when a fifth control point-based affine merge candidate is selected from among affine control point merge candidates, a control point motion vector of a first representative neighboring block and a control point motion vector of a second representative neighboring block belonging to the fifth control point-based affine merge candidate may be respectively determined as a first control point motion vector and a second control point motion vector corresponding to the fifth control point-based affine merge candidate.

For example, when a sixth control point-based affine merge candidate is selected from among affine control point merge candidates, a control point motion vector of a first representative neighboring block belonging to the sixth control point-based affine merge candidate may be determined as a first control point motion vector corresponding to the sixth control point-based affine merge candidate, and a second control point motion vector corresponding to the sixth control point-based affine merge candidate may be determined by using the control point motion vector of the first representative neighboring block and a control point motion vector of a second representative neighboring block.

A method of predicting an affine motion vector of a current block by using a control point motion vector according to an affine mode will be described with reference to FIGS. 22 and 23.

The video decoding apparatus 1700 according to an embodiment may include neighboring blocks adjacent to the right or the lower right of a current block in a control point-based affine merge candidate by considering a coding order of coding units. Accordingly, when right blocks of the current block are available, affine model-based inter prediction of the current block is possible by using a control point motion vector derived from the neighboring blocks adjacent to the right or the lower right of the current block. Also, because a new control point-based affine merge candidate for the neighboring blocks adjacent to the right or the lower right is not added, it is not necessary to change an existing process of generating a merge list by using the control point-based affine merge candidate. Because the neighboring blocks adjacent to the right or the lower right are conditionally added to the already existing control point-based affine merge candidate, an affine merge candidate list may be efficiently generated while considering the possibility of changing a coding order.

Figure 19:
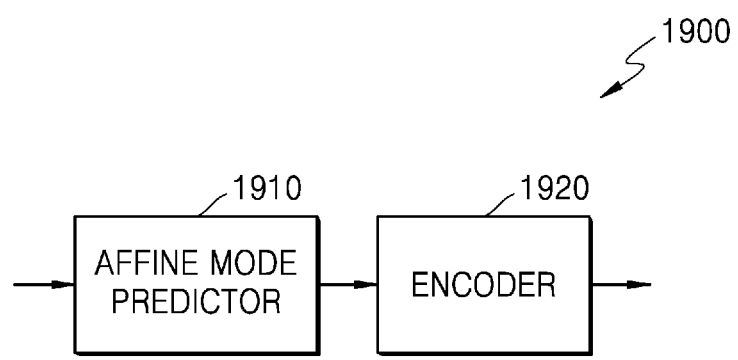
FIG. 19 is a block diagram of a video encoding apparatus according to an embodiment.

FIG. 19 is a block diagram of a video encoding apparatus according to an embodiment.

Referring to FIG. 19, a video encoding apparatus 1900 according to an embodiment may include an affine mode predictor 1910 and an encoder 1920.

The information encoder 1910 according to an embodiment may generate limited prediction information indicating whether a limited intra prediction mode is activated, and may perform entropy encoding on the limited prediction information to output the same as a bitstream.

The video encoding apparatus 1900 according to an embodiment may split a picture into one or more luma coding units, and may encode the coding units.

The video encoding apparatus 1900 according to an embodiment may include a central processor (not shown) for controlling the affine mode predictor 1910 and the encoder 1920. Alternatively, the affine mode predictor 1910 and the encoder 1920 may be operated by their own processors (not shown), and the processors (not shown) may systematically operate with each other to operate the video encoding apparatus 1900. Alternatively, the affine mode predictor 1910 and the encoder 1920 may be controlled under the control of an external processor (not shown) of the video encoding apparatus 1900.

The video encoding apparatus 1900 may include one or more data storages (not shown) in which input/output data of the affine mode predictor 1910 and the encoder 1920 are stored. The video encoding apparatus 1900 may include a memory controller (not shown) for controlling data input and output of the data storages (not show).

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment may perform a basic image encoding operation in a manner that not only a separate processor but also an image encoding processing module included in a central processing apparatus or a graphic processing apparatus perform the basic image encoding operation.

The video encoding apparatus 1900 may correspond to the encoder 1600 of the image encoding and decoding system described with reference to FIG. 16. For example, the encoder 1920 may correspond to the entropy encoder 1630 of the encoder 1600. The affine mode predictor 1910 may correspond to the inter predictor 1605 of the encoder 1600.

An information encoder 2110 according to an embodiment may split a picture into a plurality of largest coding units and may split and encode each largest coding unit into various sized and various-shaped blocks.

For example, when a prediction mode of a current block is an intra mode, the video encoding apparatus 1900 may determine a reference sample from among samples of a spatial neighboring block located in an intra prediction direction of the current block, and may determine prediction samples corresponding to the current block by using the reference sample.

For example, when a current block is predicted in a skip mode, the video encoding apparatus 1900 may determine a motion vector for predicting the current block. The video encoding apparatus 1900 may determine a reference block of the current block in a reference picture, and may determine a motion vector indicating the reference block from the current block. In the skip mode, it is not necessary to encode a residual block.

For example, when a prediction mode of a current block is an inter mode, the video encoding apparatus 1900 may determine a motion vector for predicting the current block. The video encoding apparatus 1900 may determine a reference block of the current block in a reference picture, and may determine a motion vector indicating the reference block from the current block. The video encoding apparatus 1900 may determine a residual sample of the current block from reference samples included in the reference block, and may perform transform and quantization on the residual sample based on a transform unit, to generate a quantized transform coefficient.

The current block that is a block generated by being split according to a tree structure from an image may correspond to, for example, a largest coding unit, a coding unit, or a transform unit. The video encoding apparatus 1900 may encode blocks included in a picture according to a coding order.

In particular, when affine model-based inter prediction is performed on the current block, the affine mode predictor 1910 may be invoked. The affine mode predictor 1910 may generate an affine merge candidate list including a control point-based affine merge candidate corresponding to control point motion vectors determined by using motion vectors of neighboring blocks included in a block group of representative neighboring blocks according to corners of the current block.

In detail, when inter prediction of the current block is performed in an affine merge mode, before a control point-based affine merge candidate is configured, the affine mode predictor 1910 according to an embodiment may generate an affine merge candidate list including a model-based affine merge candidate. When motion prediction is performed on a neighboring block before the current block and motion information of the neighboring block is available, a model-based affine merge candidate corresponding to the neighboring block may be included in the affine merge candidate list. When the motion information of the neighboring block is available, the model-based affine merge candidate corresponding to the neighboring block is also set as available. In contrast, when the motion information of the neighboring block is not available, the model-based affine merge candidate corresponding to the neighboring block is also set as unavailable. However, when the number of available model-based affine merge candidates is less than a certain number, the affine mode predictor 1910 may determine a control point-based affine merge candidate corresponding to a group of representative neighboring blocks according to corners of the current block, and may add the control point-based affine merge candidate to the affine merge candidate list. The certain number may be a maximum number of affine merge candidates that are allowed to be included in the affine merge candidate list, and may be set to, for example, 5.

Accordingly, an available model-based affine merge candidate may be included in an affine merge candidate list of a current block, and when the number of valid affine merge candidates of the current block is less than a certain number, control point-based affine merge candidates as many as the insufficient number of affine merge candidates may be added to the affine merge candidate list.

The affine mode predictor 1910 according to an embodiment may select a merge candidate with a smallest error to express an affine motion vector of a current block from among merge candidates included in an affine merge candidate list. The affine mode predictor 1910 may determine an affine motion vector of the current block by using control point motion vectors corresponding to a merge candidate selected from the affine merge candidate list. The affine mode predictor 1910 may determine an affine motion model parameter of the current block by using a control point motion vector, and may determine an affine motion vector of the current block by using the affine motion model parameter of the current block. Prediction samples of the current block may be determined, by using a reference sample indicated by the affine motion vector of the current block.

When a model-based affine merge candidate is selected in the affine merge candidate list, control point motion vectors corresponding to the model-based affine merge candidate may be determined by using an affine model of one neighboring block. An affine motion vector of the current block may be determined by using the control point motion vectors corresponding to the model-based affine merge candidate.

When a control point-based affine merge candidate is selected in the affine merge candidate list, control point motion vectors corresponding to the control point-based affine merge candidate may be determined by using control points of the current block or neighboring blocks included in a corresponding block group. An affine motion vector of the current block may be determined by using the control point motion vectors corresponding to the control point-based affine merge candidate. In detail, when a model-based affine merge candidate is selected from the affine merge candidate list, control point motion vectors corresponding to control points of the current block may be determined by using a vertical change amount, a horizontal change amount, and a motion vector of one neighboring block corresponding to the model-based affine merge candidate. In more detail, a reference index, a prediction direction, and a control point motion vector corresponding to the model-based affine merge candidate may be respectively determined, by using a reference index, a prediction direction, and a motion vector of a neighboring block. A reference index, a prediction direction, and an affine motion vector of the current block may be respectively determined by using the reference index, the prediction direction, and the control point motion vector corresponding to the affine merge candidate.

In detail, when a control point-based affine merge candidate is selected from the affine merge candidate list, motion vectors of neighboring blocks adjacent to control points of the current block may be determined as control point motion vectors, and an affine motion vector of the current block may be determined by using the control point motion vectors according to an affine model of the current block. In more detail, a reference index, a prediction direction, and a control point motion vector corresponding to an affine merge candidate may be respectively determined by using a reference index, a prediction direction, and a motion vector of representative neighboring blocks belonging to a block group. A reference index, a prediction direction, and an affine motion vector of the current block may be respectively determined by using the reference index, the prediction direction, and the control point motion vector corresponding to the affine merge candidate. The video encoding apparatus 1900 according to an embodiment may change a coding order between laterally adjacent coding units according to a SUCO method. The encoder 1920 may encode a coding order flag indicating a direction of a coding order. When a left sub-coding unit is first encoded and then a right sub-coding unit is encoded from among laterally adjacent sub-coding units generated by being split from a current coding unit, the coding order flag may be encoded to indicate a left-to-right direction. When a right sub-coding unit is first encoded and then a left sub-coding unit is encoded, the coding order flag may be encoded to indicate a right-to-left direction.

For example, when a right block of a current block is initially encoded and is available, a representative neighboring block adjacent to a lower right corner of the current block may be a block whose available motion information is obtained from among a neighboring block adjacent to the lower right corner of the current block and a right boundary of the current block and a neighboring block diagonally adjacent to the lower right corner of the current block. Whether available motion information is obtained in an order of a neighboring block C1 and a neighboring block C0 may be checked, and a block whose available motion information is initially obtained may be determined as a BR representative neighboring block. However, when the right block of the current block is not available, a representative neighboring block adjacent to the lower right corner of the current block is a collocated block located at a point diagonally adjacent to the lower right corner of the current block. The collocated block is a block included in a collocated picture and may be included as a temporal merge candidate in an affine merge candidate list.

In another example, when a right block of a current block is initially decoded and is available, a BR representative neighboring block adjacent to a lower right corner of the current block may be a block whose available motion information is obtained from among a neighboring block C1 adjacent to the lower right corner of the current block and a right boundary of the current block, a neighboring block C0 diagonally adjacent to the lower right corner of the current block, and a collocated block Col located at a point diagonally adjacent to the lower right corner of the current block. Whether available motion information is obtained in an order of the neighboring block C1, the neighboring block C0, and the collocated block Col may be checked, and a block whose available motion information is initially obtained may be determined as a BR representative neighboring block.

The collocated block is a block included in a collocated picture and may be included as a temporal merge candidate in an affine merge candidate list. The collocated block adjacent to the lower right corner of the current block may be a block located at a coordinate corresponding to the lower right corner of the current block in the collocated picture.

The video encoding apparatus 1900 according to an embodiment needs to check availability of motion information of a neighboring block in order to include a valid merge candidate in an affine merge candidate list. This is because a valid merge candidate may be determined from a neighboring block on which motion prediction is performed and whose available motion information is obtained. In general, a neighboring block on which motion prediction has been performed before a current block is available for prediction of the current block. In detail, when motion prediction has been performed on a left neighboring block of a current block before the current block, motion information of the left neighboring block is available. When motion prediction has been performed on a right neighboring block of a current block before the current block, motion information of the right neighboring block is available. In contrast, when motion prediction has not been performed on a left neighboring block of a current block, motion information of the left neighboring block is unavailable. When motion prediction has not been performed on a right neighboring block of a current block, motion information of the right neighboring block is unavailable.

Because right neighboring blocks, instead of left neighboring blocks of a neighboring block, may be initially encoded according to a coding order, the video encoding apparatus 1900 according to an embodiment needs to determine an affine merge candidate list by considering the coding order.

The encoder 1920 according to an embodiment may encode a merge mode flag indicating whether an inter prediction mode of a current block is a merge mode, and may encode an affine flag indicating whether motion compensation based on an affine model is performed to generate a prediction sample of the current block. The encoder 1920 according to an embodiment may encode an affine merge index indicating one from an affine merge candidate list.

Hereinafter, a video encoding method of performing affine model-based prediction by generating an affine merge candidate list by considering a coding order will be described in detail with reference to FIG. 20.

Figure 20:
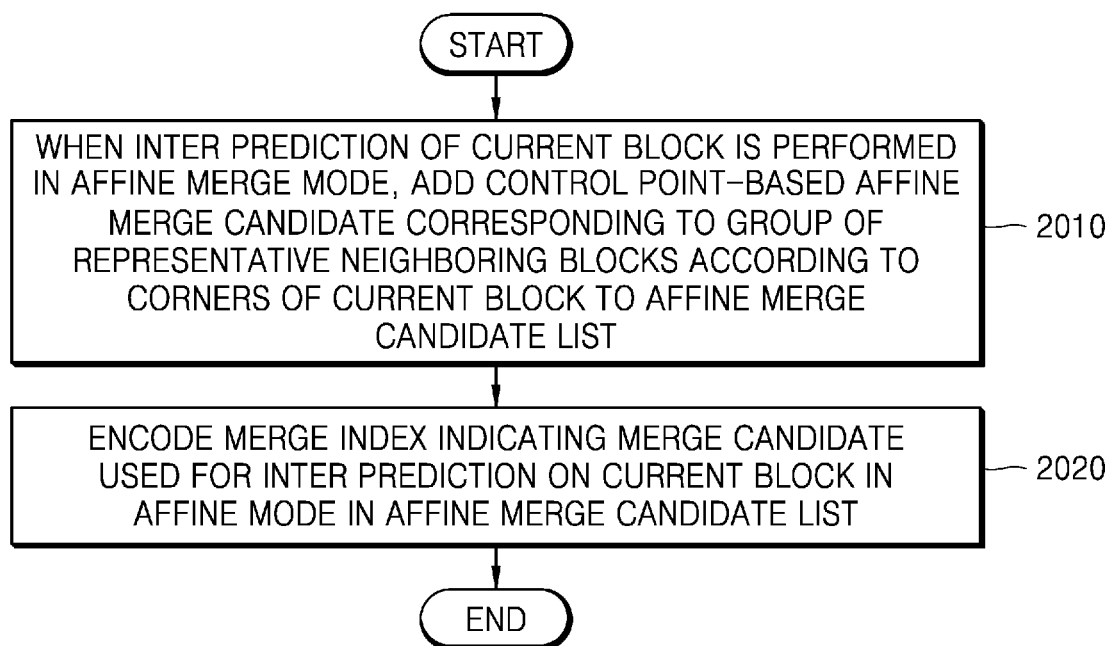
FIG. 20 is a flowchart of a video encoding method according to an embodiment.

FIG. 20 is a flowchart of a video encoding method according to an embodiment.

In operation 2010, when inter prediction of a current block is performed in an affine merge mode, the affine mode predictor 1910 may generate an affine merge candidate list including a control point-based affine merge candidate corresponding to control point motion vectors determined by using motion vectors of neighboring blocks included in a block group of representative neighboring blocks according to corners of the current block.

In particular, when a right block of the current block is available, a representative neighboring block adjacent to a lower right corner of the current block may be a block whose available motion information is obtained from among a neighboring block adjacent to the lower right corner of the current block and a right boundary of the current block and a neighboring block diagonally adjacent to the lower right corner of the current block. However, when the right block of the current block is not available, a representative neighboring block adjacent to the lower right corner of the current block may be a collocated block located at a point diagonally adjacent to the lower right corner of the current block.

In detail, the affine mode predictor 1910 according to an embodiment may determine availability of motion information of a first representative neighboring block adjacent to an upper left corner of the current block, availability of motion information of a second representative neighboring lock adjacent to an upper right corner of the current block, availability of motion information of a third representative neighboring block adjacent to a lower left corner of the current block, and availability of motion information of a fourth representative neighboring block adjacent to a lower right corner of the current block.

The affine mode predictor 1910 according to an embodiment may determine a control point-based affine merge candidate corresponding to a block group including a plurality of representative neighboring blocks, based on availability of at least one of the motion information of the first representative neighboring block, the motion information of the second representative neighboring block, the motion information of the third representative neighboring block, and the motion information of the fourth representative neighboring block.

For example, the affine mode predictor 1910 may determine six control point-based affine merge candidates. Groups of representative neighboring blocks corresponding to the control point-based affine merge candidates may be different from one another. The affine mode predictor 1910 may include only available candidates, from among the control point-based affine merge candidates, in the affine merge candidate list.

The affine mode predictor 1910 according to an embodiment may determine a first control point-based affine merge candidate corresponding to a block group including a first representative neighboring block, a second representative neighboring block, and a third representative neighboring block. In detail, when availability of motion information of the first representative neighboring block adjacent to an upper left corner of a current block, availability of motion information of the second representative neighboring block adjacent to an upper right corner of the current block, and availability of motion information of the third representative neighboring block adjacent to a lower left corner of the current block, respectively, indicate available, the affine mode predictor 1910 may determine that the first control point-based affine merge candidate corresponding to the block group including the first representative neighboring block, the second representative neighboring block, and the third representative neighboring block is available. When any of the motion information of the first representative neighboring block, the motion information of the second representative neighboring block, and the motion information of the third representative neighboring block is not available, the first control point-based affine merge candidate may be set as unavailable.

The affine mode predictor 1910 according to an embodiment may include a second control point-based affine merge candidate corresponding to a block group including a first representative neighboring block, a second representative neighboring block, and a fourth representative neighboring block. In detail, when availability of motion information of the first representative neighboring block adjacent to an upper left corner of a current block, availability of motion information of the second representative neighboring block adjacent to an upper right corner of the current block, and availability of motion information of the fourth representative neighboring block adjacent to a lower right corner of the current block, respectively, indicate available, the affine mode predictor 1910 may determine that the second control point-based affine merge candidate corresponding to the block group including the first representative neighboring block, the second representative neighboring block, and the fourth representative neighboring block is available. When any of the motion information of the first representative neighboring block, the motion information of the second representative neighboring block, and the motion information of the fourth representative neighboring block is not available, the second control point-based affine merge candidate may be set as unavailable.

The affine mode predictor 1910 according to an embodiment may determine a third control point-based affine merge candidate corresponding to a block group including a first representative neighboring block, a third representative neighboring block, and a fourth representative neighboring block. In detail, when availability of motion information of the first representative neighboring block adjacent to an upper left corner of a current block, availability of motion information of the third representative neighboring block adjacent to a lower left corner of the current block, and availability of motion information of the fourth representative neighboring block adjacent to a lower right corner of the current block, respectively, indicate available, the affine mode predictor 1910 may determine that the third control point-based affine merge candidate corresponding to the block group including the first representative neighboring block, the third representative neighboring block, and the fourth representative neighboring block is available. When any of the motion information of the first representative neighboring block, the motion information of the third representative neighboring block, and the motion information of the fourth representative neighboring block is not available, the third control point-based affine merge candidate may be set as unavailable.

The affine mode predictor 1910 according to an embodiment may determine a fourth control point-based affine merge candidate including a second representative neighboring block, a third representative neighboring block, and a fourth representative neighboring lock. In detail, when availability of motion information of the second representative neighboring block adjacent to an upper right corner of a current block, availability of motion information of the third representative neighboring block adjacent to a lower left corner of the current block, and availability of motion information of the fourth representative neighboring block adjacent to a lower right corner of the current block, respectively, indicate available, the affine mode predictor 1910 may determine that the fourth control point-based affine merge candidate corresponding to the block group including the second representative neighboring block, the third representative neighboring block, and the fourth representative neighboring block is available. When any of the motion information of the second representative neighboring block, the motion information of the third representative neighboring block, and the motion information of the fourth representative neighboring block is not available, the fourth control point-based affine merge candidate may be set as unavailable.

The affine mode predictor 1910 according to an embodiment may determine a fifth control point-based affine merge candidate corresponding to a block group including a first representative neighboring block and a second representative neighboring block. In detail, when availability of motion information of the first representative neighboring block adjacent to an upper left corner of a current block and availability of motion information of the second representative neighboring block adjacent to an upper right corner of the current block, respectively, indicate available, the affine mode predictor 1910 may determine that the fifth control point-based affine merge candidate corresponding to the block group including the first representative neighboring block and the second representative neighboring block is available. When any of the motion information of the first representative neighboring block and the motion information of the second representative neighboring block is not available, the fifth control point-based affine merge candidate may be set as unavailable.

The affine mode predictor 1910 according to an embodiment may determine a sixth control point-based affine merge candidate corresponding to a first representative neighboring block and a third representative neighboring block. When availability of motion information of the first representative neighboring block adjacent to an upper left corner of a current block and availability of motion information of the third representative neighboring block adjacent to a lower left corner of the current block, respectively, indicate available, the affine mode predictor 1910 may determine that the sixth control point-based affine merge candidate corresponding to the block group including the first representative neighboring block and the third representative neighboring block is available. When any of the motion information of the first representative neighboring block and the motion information of the third representative neighboring block is not available, the sixth control point-based affine merge candidate may be a set as unavailable.

According to an embodiment, a first representative neighboring block adjacent to an upper left corner of a current block may be a block whose available motion information is initially obtained from among a neighboring block diagonally adjacent to the upper left corner of the current block, a neighboring block adjacent to the upper left corner of the current block and an upper boundary of the current block, and a neighboring block adjacent to the upper left corner of the current block and a left boundary of the current block.

According to an embodiment, a second representative neighboring block adjacent to an upper right corner of a current block may be a block whose available motion information is initially obtained from among a neighboring block diagonally adjacent to the upper right corner of the current block, a neighboring block adjacent to the upper right corner of the current block and an upper boundary of the current block, and a neighboring block adjacent to the upper right corner of the current block and a right boundary of the current block.

According to an embodiment, when a left block of a current block is available, a third representative neighboring block adjacent to a lower left corner of the current block may be a block whose available motion information is initially obtained from among a neighboring block diagonally adjacent to the lower left corner of the current block and a neighboring block adjacent to the lower left corner of the current block and a left boundary of the current block. However, when the left block of the current block is not available, the third representative neighboring block may be a collocated block located at a point diagonally adjacent to the lower left corner of the current block. The collocated block adjacent to the lower left corner of the current block may be a block located at a coordinate corresponding to the lower left corner of the current block in a collocated picture.

According to an embodiment, when a right block of a current block is available, a fourth representative neighboring block adjacent to a lower right corner of the current block may be a block whose available motion information is initially obtained from among a neighboring block adjacent to the lower right corner of the current block and a right boundary of the current block and a neighboring block diagonally adjacent to the lower right corner of the current block. However, when the right block of the current block is not available, the fourth representative neighboring block may be a collocated block located at a point diagonally adjacent to the lower right corner of the current block.

In operation 2020, the encoder 1920 may encode a merge index indicating a merge candidate used to determine a control point motion vector for performing inter prediction on the current block in an affine mode, in the affine merge candidate list.

The affine mode predictor 1910 may determine an affine motion model parameter by using the control point motion vector. The affine motion model parameter may include a horizontal change amount of a motion vector, a vertical change amount of the motion vector, and a base motion vector. The affine mode predictor 1910 according to an embodiment may determine an affine motion vector of the current block by using the horizontal change amount of the motion vector, the vertical change amount of the motion vector, and the base motion vector. Prediction samples of the current block may be obtained by using samples of a reference block indicated by the affine motion vector of the current block.

When a control point-based affine merge candidate is selected from the affine merge candidate list, the affine mode predictor 1910 according to an embodiment may determine control point motion vectors by using a motion vector of representative neighboring blocks adjacent to corners of the current block belonging to a group of neighboring blocks corresponding to the control point-based affine merge candidate. First, control point motion information (a motion vector, a prediction direction, and a reference picture index) may be determined, by using motion information (a motion vector, a prediction direction, and a reference picture index) of a representative neighboring block, according to an upper left control point, an upper right control point, a lower left control point, and a lower right control point of the current block.

Control point motion information of the upper left control point may be determined, by using motion information of a representative neighboring block (first representative neighboring block) from among neighboring blocks of the upper left control point. Control point motion information of the upper right control point may be determined, by using motion information of a representative neighboring block (second representative neighboring block) from among neighboring blocks of the upper right control point. Control point motion information of the lower left control point may be determined, by using motion information of a representative neighboring block (third representative neighboring block) from among neighboring blocks of the lower left control point. Control point motion information of the lower right control point may be determined, by using motion information of a representative neighboring block (fourth representative neighboring block) from among neighboring blocks of the lower right control point.

Next, by using a control point motion information of control points belonging to an affine merge candidate, that is, a representative neighboring block adjacent to corners of the current block belonging to a group of neighboring blocks corresponding to a control point-based affine merge candidate, pieces of control point motion information corresponding to the affine merge candidate may be determined.

For example, when a first control point-based affine merge candidate is selected from among affine control point merge candidates, a control point motion vector of a first representative neighboring block, a control point motion vector of a second representative neighboring block, and a control point motion vector of a third representative neighboring block belonging to a second control point-based affine merge candidate may be respectively determined as first, second, and third control point motion vectors corresponding to a first affine merge candidate.

For example, when a second control point-based affine merge candidate is selected from among affine control point merge candidates, a control point motion vector of a first representative neighboring block and a control point motion vector of a second representative neighboring block belonging to the second control point-based affine merge candidate may be respectively determined as a first control point motion vector and a second control motion vector corresponding to the second control point-based affine merge candidate, and a third control point motion vector corresponding to the second control point-based affine merge candidate may be determined by using the control point motion vector of the first representative neighboring block, the control point motion vector of the second representative neighboring block, and a control point motion vector of a fourth representative neighboring block.

For example, when a third control point-based affine merge candidate is selected from among affine control point merge candidates, a control point motion vector of a first representative neighboring block and a control point motion vector of a third representative neighboring block belonging to the third control point-based affine merge candidate may be respectively determined as a first control point motion vector and a third control motion vector corresponding to the third control point-based affine merge candidate, and a second control point motion vector corresponding to the third control point motion vector may be determined by using the control point motion vector of the first representative neighboring block, the control point motion vector of the third representative neighboring block, and a control point motion vector of a fourth representative neighboring block.

For example, when a fourth control point-based affine merge candidate is selected from among affine control point merge candidates, a control point motion vector of a second representative neighboring block and a control point motion vector of a third representative neighboring block belonging to the fourth control point-based affine merge candidate may be respectively determined as a second control point motion vector and a third control motion vector, and a first control point motion vector corresponding to the fourth control point-based affine merge candidate may be determined by using the control point motion vector of the second representative neighboring block, the motion vector of the third representative neighboring block, and a motion vector of a fourth representative neighboring block.

For example, when a fifth control point-based affine merge candidate is selected from among affine control point merge candidates, a control point motion vector of a first representative neighboring block and a control point motion vector of a second representative neighboring block belonging to the fifth control point-based affine merge candidate may be respectively determined as a first control point motion vector and a second control point motion vector corresponding to the fifth control point-based affine merge candidate.

For example, when a sixth control point-based affine merge candidate is selected from among affine control point merge candidates, a control point motion vector of a first representative neighboring block belonging to the sixth control point-based affine merge candidate may be determined as a first control point motion vector corresponding to the sixth control point-based affine merge candidate, and a second control point motion vector corresponding to the sixth control point-based affine merge candidate may be determined by using the control point motion vector of the first representative neighboring block and a control point motion vector of a second representative neighboring block.

A method of predicting an affine motion vector of a current block by using a control point motion vector according to an affine mode will be described with reference to FIGS. 22 and 23.

The video encoding apparatus 1900 according to an embodiment may include neighboring blocks adjacent to the right or the lower right of a current block in a control point-based affine merge candidate by considering a coding order of coding units. Accordingly, when right blocks of the current block are available, affine model-based inter prediction of the current block is possible by using a control point motion vector derived from the neighboring blocks adjacent to the right or the lower right of the current block. Also, because a new control point-based affine merge candidate for the neighboring blocks adjacent to the right or the lower right is not added, it is not necessary to change an existing process of generating a merge list by using the control point-based affine merge candidate. Because the neighboring blocks adjacent to the right or the lower right are conditionally added to the already existing control point-based affine merge candidate, an affine merge candidate list may be efficiently generated while considering the possibility of changing a coding order.

Figure 21:
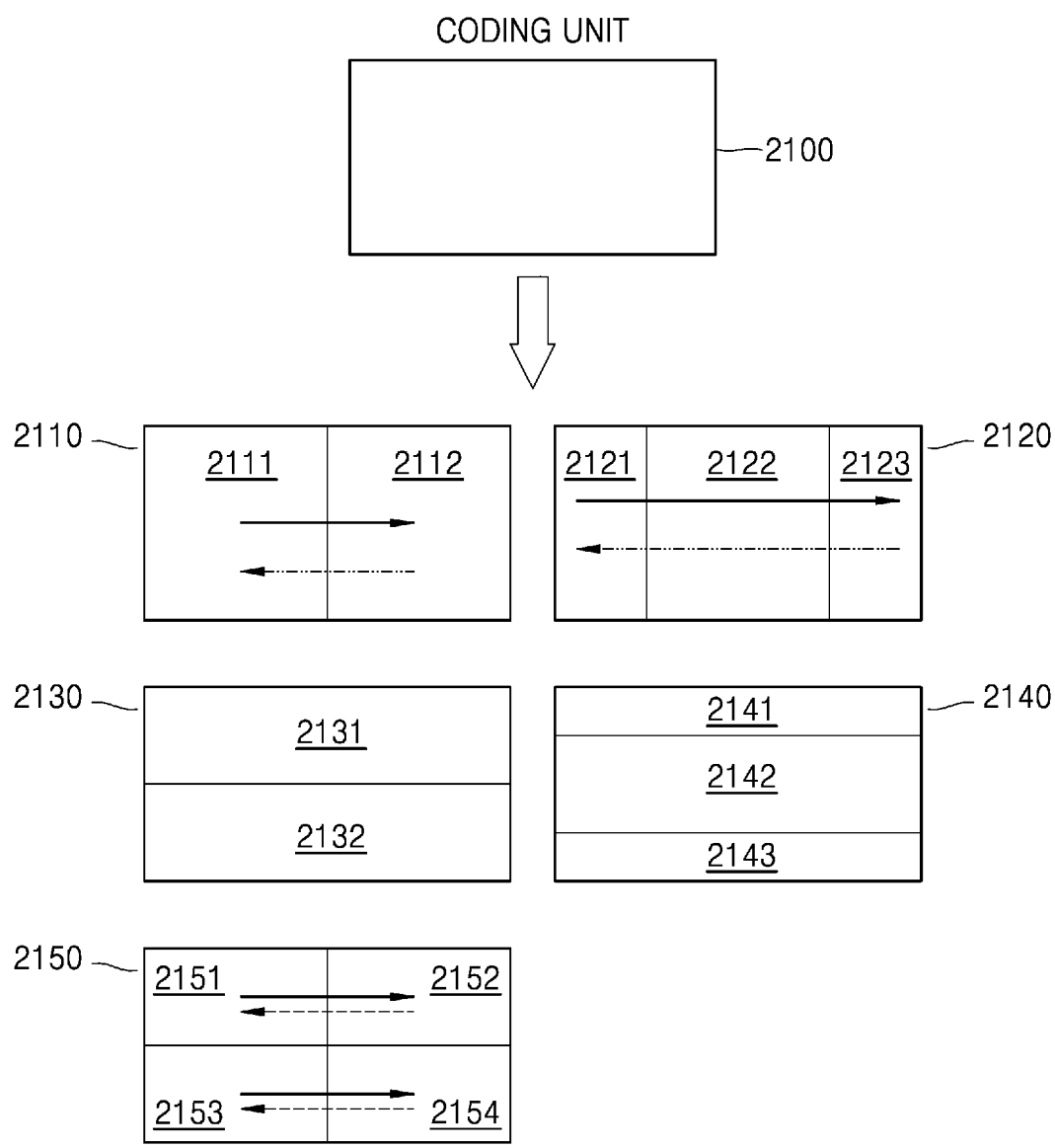
FIG. 21 illustrates that a coding order of coding units is changed according to a split unit coding order (SUCO) method, according to various methods.

FIG. 21 illustrates that a coding order of coding units is changed according to a split unit coding order (SUCO) method, according to various embodiments.

When a coding unit 2100 is split, a coding order flag indicating a direction of a coding order of sub-coding units split from the coding unit 2100 may be signaled.

For example, sub-coding units 2111 and 2112 generated through binary vertical splitting 2110 of the coding unit 2100 may include a left coding unit 2111 and a right coding unit 2112. Sub-coding units 2121, 2122, and 2123 generated through ternary vertical splitting 2120 of the coding unit 2100 may include a left coding unit 2121, a central coding unit 2122, and a right coding unit 2123. Sub-coding units 2131 and 2132 generated through binary horizontal splitting 2130 of the coding unit 2100 may include an upper coding unit 2131 and a lower coding unit 2132. Sub-coding units 2141, 2142, and 2143 generated through ternary horizontal splitting 2140 of the coding unit 2100 may include an upper coding unit 2141, a central coding unit 2142, and a lower coding unit 2143. Sub-coding units 2151, 2152, 2153, and 2154 generated through quad-tree splitting 2150 of the coding unit 2100 may include an upper left coding unit 2151, an upper right coding unit 2152, a lower left coding unit 2153, and a lower right coding unit 2154.

When the coding order flag indicates a left-to-right direction, the left coding unit 2111 from among the sub-coding units 2111 and 2112 generated through the binary vertical splitting 2110 may be decoded before the right coding unit 2112. In this case, although information of the left coding unit 2111 is available for prediction of the right coding unit 2112, information of the right coding unit 2112 is not available for prediction of the left coding unit 2111. In contrast, when the coding order flag indicates a right-to-left direction, the right coding unit 2112 may be decoded before the left coding unit 2111. In this case, although information of the left coding unit 2111 is not available for prediction of the right coding unit 2112, information of the right coding unit 2112 is available for prediction of the left coding unit 2111.

Likewise, when the coding order flag indicates a left-to-right direction, the left coding unit 2121 from among the sub-coding units 2121, 2122, and 2123 generated through the ternary vertical splitting 2120 may be decoded before the central coding unit 2122, and the central coding unit 2122 may be decoded before the right coding unit 2123. In this case, although information of the left coding unit 2121 is available for prediction of the central coding unit 2122, information of the central coding unit 2122 is not available for prediction of the left coding unit 2121. Although information of the right coding unit 2123 is not available for prediction of the central coding unit 222, information of the central coding unit 2122 is available for prediction of the right coding unit 2123. In contrast, when the coding order flag indicates a right-to-left direction, the central coding unit 2122 may be decoded before the left coding unit 2121, and the right coding unit 2123 may be decoded before the central coding unit 2122. In this case, although information of the left coding unit 2121 is not available for prediction of the central coding unit 2122, information of the central coding unit 2122 is available for prediction of the left coding unit 2121. Although information of the right coding unit 2123 is available for prediction of the central coding unit 2122, information of the central coding unit 2122 is not available for prediction of the right coding unit 2123.

The coding order flag does not affect a coding order of the sub-coding units 2131 and 2132, and 2141, 2142, and 2143 generated through the binary horizontal splitting 2130 and the ternary horizontal splitting 2140 of the coding unit 2100.

When the coding unit 2100 is quad-tree split through the quad-tree splitting 2150, a coding order indicated by the coding order flag may simultaneously affect a coding order between the upper left coding unit 2151 and the upper right coding unit 2152 and a coding order between the lower left coding unit 2153 and the lower right coding unit 2154. In detail, when the coding order flag indicates a left-to-right direction, the upper left coding unit 2151 may be decoded before the upper right coding unit 2152, and the lower left coding unit 2153 may be decoded before the lower right coding unit 2154. In this case, although information of the upper left coding unit 2151 is available for prediction of the upper right coding unit 2152, information of the upper right coding unit 2152 is not available for prediction of the upper left coding unit 2151. Although information of the lower left coding unit 2153 is available for prediction of the lower right coding unit 2154, information of the lower right coding unit 2154 is not available for prediction of the lower left coding unit 2153. In contrast, when the coding order flag indicates a right-to-left direction, the upper right coding unit 2152 may be decoded before the upper left coding unit 2151, and the lower right coding unit 2154 may be decoded before the lower left coding unit 2153. In this case, although information of the upper left coding unit 2151 is not available for prediction of the upper right coding unit 2152, information of the upper right coding unit 2152 is available for prediction of the upper left coding unit 2151. Although information of the lower left coding unit 2153 is not available for prediction of the lower right coding unit 2154, information of the lower right coding unit 2154 is available for prediction of the lower left coding unit 2153.

As described with reference to FIG. 21, whether neighboring block is available for prediction of a current block may be determined according to a coding order flag. Accordingly, the video decoding apparatus 1700 and the video encoding apparatus 1900 according to an embodiment propose a method by which, when inter prediction according to an affine mode is performed, availability of a neighboring block according to a coding order is checked and a representative neighboring block included in a control point-based affine merge candidate is determined.

Figure 22:
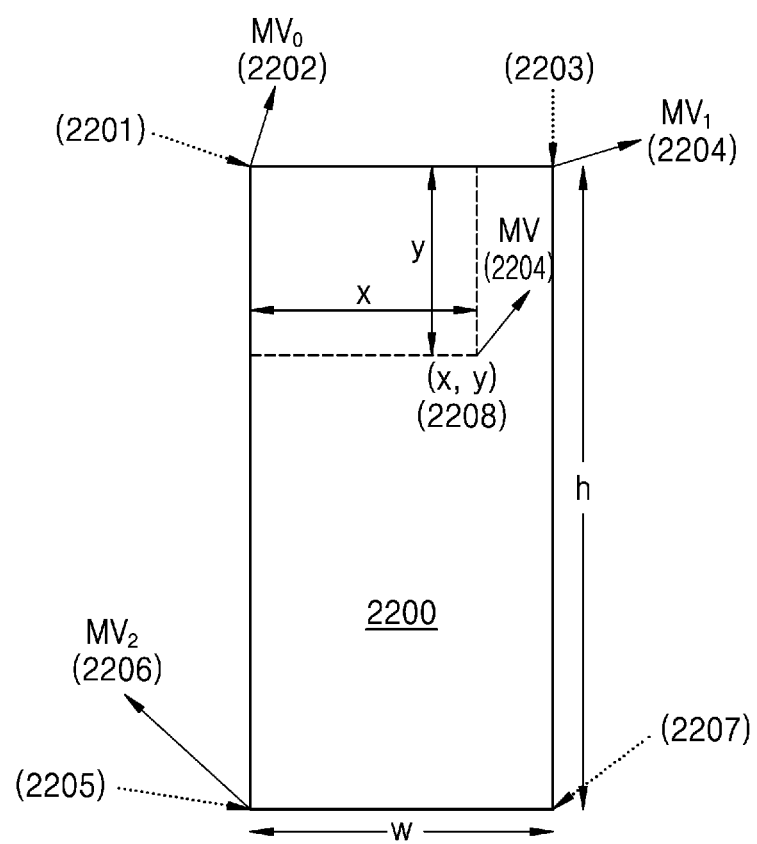
FIG. 22 illustrates a method of deriving a motion vector applied to a sample of a current block in an affine mode.

FIG. 22 illustrates a method of deriving a motion vector applied to a sample of a current block in an affine mode.

In an affine mode, in order to derive a motion vector of a sample of a current block 2200, at least three affine parameters are required. In detail, an affine mode may include a 6-parameter affine mode and a 4-parameter affine mode. Hereinafter, a method of deriving a motion vector of a sample of the current block 2200 according to each affine mode will be described.

In the 6-parameter affine mode, the affine mode predictor 1910 and the affine mode predictor 1720 may obtain three motion vectors 2202, 2204, and 2206 from neighboring samples (2201, 2203, and 2205) of the current block 2200. The first motion vector 2202 may be obtained from neighboring blocks of an upper left coordinate 2201 of the current block 2200. The second motion vector 2204 may be obtained from neighboring samples of an upper right coordinate 2203 of the current block 2200. The third motion vector 2206 may be obtained from neighboring samples of a lower left coordinate 2205 of the current block 2200. Although the third motion vector 2206 is obtained based on the lower left coordinate 2205 of the current block 2200 in FIG. 22, the third motion vector 2206 may be obtained based on a lower right coordinate 2207 of the current block 2200 according to an embodiment. The affine mode predictor 1910 and the affine mode predictor 1720 may determine an x component and a y component of the first motion vector 2202, an x component and a y component of the second motion vector 2204, and an x component and a y component of the third motion vector 2206 as parameters.

According to an embodiment, the first motion vector 2202 may be determined to be an average of motion vectors of a plurality of neighboring blocks adjacent to the upper left coordinate 2201 of the current block 2200. Likewise, the second motion vector 2204 may be determined to be an average of motion vectors of a plurality of neighboring blocks adjacent to the upper right coordinate 2203 of the current block 2200. Also, the third motion vector 2206 may be determined to be an average of motion vectors of a plurality of neighboring blocks adjacent to the lower left coordinate 2205 or the lower right coordinate 2207 of the current block 2200.

A motion vector 2210 of a sample 2208 of the current block 2200 may be determined according to the first motion vector 2202, the second motion vector 2204, and the third motion vector 2206 by using Equations 1 through 3.

In Equations 1 through 3, x denotes a horizontal distance difference between the upper left coordinate 2201 of the current block 2200 and the sample 2208 of the current block 2200, and y denotes a vertical distance difference between the upper left coordinate 2201 of the current block 2200 and the sample 2208 of the current block 2200. $MV_0$ denotes the first motion vector 2202, $MV_1$ denotes the second motion vector 2204, and $MV_2$ denotes the third motion vector 2206. MV denotes the motion vector 2210 of the sample 2208 of the current block. w denotes a width of the current block 2200, and h denotes a height of the current block 2200. $dMV_x$ denotes a horizontal change rate of the motion vector 2210, and $dMV_y$ denotes a vertical change rate of the motion vector 2210.

$$dMV_x = (MV_1 - MV_0)/w \quad \text{[Equation 1]}$$

$$dMV_y = (MV_2 - MV_0)/h \quad \text{[Equation 2]}$$

$$MV = MV_0 + x \cdot dMV_x + y \cdot dMV_y \quad \text{[Equation 3]}$$

Equation 1 shows a method of obtaining the horizontal change rate $dMV_x$ of the motion vector 2210. According to Equation 1, a value obtained by dividing a value, obtained by subtracting the first motion vector 2202 from the second motion vector 2204, by the width the current block 2200 is determined as the horizontal change rate of the motion vector 2210.

Equation 2 shows a method of obtaining the vertical change rate $dMV_y$ of the motion vector 2210. According to Equation 2, a value obtained by dividing a value, obtained by subtracting the first motion vector 2202 from the third motion vector 2206, by the height of the current block 2200 is determined as the vertical change rate of the motion vector 2210.

Equation 3 shows a method of obtaining the motion vector 2210. According to Equation 2, the motion vector 2210 is determined to be a value obtained by adding inner product values of (x, y), which are coordinates of the sample 2208 of the current block 2200 with respect to the upper left coordinate 2201 of the current block 2200, and ($dMV_x$, $dMV_y$) indicating the vertical change rate and the horizontal change rate, to the first motion vector 2202 $MV_0$.

According to Equations 1 through 3, motion vectors of all samples or sub-blocks included in the current block 2200 may be determined. According to Equations 1 through 3, motion vectors of samples may be differently determined according to locations of the samples. Equations 1 and 2 may be applied when vertical components of coordinates from which the first motion vector 2202 and the second motion vector 2204 are extracted are the same and horizontal components of coordinates from which the first motion vector 2202 and the third motion vector 2206 are extracted are the same. Accordingly, a generalized equation of determining a motion vector of the current block 2200 will be described below with reference to FIG. 28.

In the 6-parameter affine mode, because the motion vector 2210 is determined by three motion vectors, a reference block of the current block 2200 may be zoomed, rotated, and sheared from the current block 2200.

In the 4-parameter affine mode, the affine mode predictor 1910 and the affine mode predictor 1720 may obtain two motion vectors 2202 and 2204 from neighboring samples of the current block 2200. Like in the 6-parameter affine mode, the first motion vector 2202 may be obtained from neighboring samples of an upper left coordinate of the current block 2200. Likewise, the second motion vector 2204 may be obtained from neighboring samples of an upper right coordinate of the current block 2200. The affine mode predictor 1910 and the affine mode predictor 1720 may determine an x component and a y component of the first motion vector 2202 and an x component and a y component of the second motion vector 2204 as affine parameters.

In the 4-parameter affine mode, the third motion vector 2206 is not determined from a lower left coordinate or a lower right coordinate of the current block 2200, but is determined by combining the first motion vector 2202 with the second motion vector 2204.

Equations 4 and 5 show a method of determining the third motion vector 2206 by combining the first motion vector 2202 with the second motion vector 2204. In Equations 4 and 5, x denotes a horizontal component of a motion vector, and a y denotes a vertical component of the motion vector. $MV_0$ denotes the first motion vector 2202, $MV_1$ denotes the second motion vector 2204, and $MV_2$ denotes the third motion vector 2206. w denotes a width of the current block 2200, and h denotes a height of the current block 2200.

$$MV_2[x] = (MV_1[y] - MV_0[y]) * w/h + MV_0[x] \quad \text{[Equation 4]}$$

$$MV_2[y] = (MV_0[x] - MV_1[x]) * w/h + MV_0[y] \quad \text{[Equation 5]}$$

According to Equation 4, a horizontal coordinate value ($MV_2[x]$) of the third motion vector 2206 is determined to be a value (($MV_1[y] - MV_0[y]$)*w/h + $MV_0[x]$) obtained by adding a horizontal coordinate value ($MV_0[x]$) of the first motion vector 2202 to a multiplication product of a value ($MV_1[y] - MV_0[y]$), in which a vertical coordinate value of the first motion vector 2202 is subtracted from a vertical coordinate value of the second motion vector 2204, and a value (w/h), in which a width of the current block is divided by a height of the current block.

According to Equation 5, a vertical coordinate value ($MV_2[y]$) of the third motion vector 2206 is determined to be a value (($MV_0[x] - MV_1[x]$)*w/h + $MV_0[y]$) obtained by adding a vertical coordinate value ($MV_0[y]$) of the first motion vector 2202 to a multiplication product of a value ($MV_0[x]-MV_1[x]$), in which a horizontal coordinate value of the second motion vector 2204 is subtracted from a horizontal coordinate value of the first motion vector 2202, and a value (w/h), in which a width of the current block is divided by a height of the current block.

In the 4-parameter affine mode, an x component and a y component of the third motion vector 2206 are derived from the first motion vector 2202 and the second motion vector 2204. Accordingly, unlike in the 6-parameter affine mode, in the 4-parameter affine mode, a reference block of the current block 2200 may be zoomed and rotated from the current block 2200 based on the first motion vector 2202 and the second motion vector 2204. That is, in the 4-parameter affine mode, the current block 2200 is not sheared.

Figure 23:
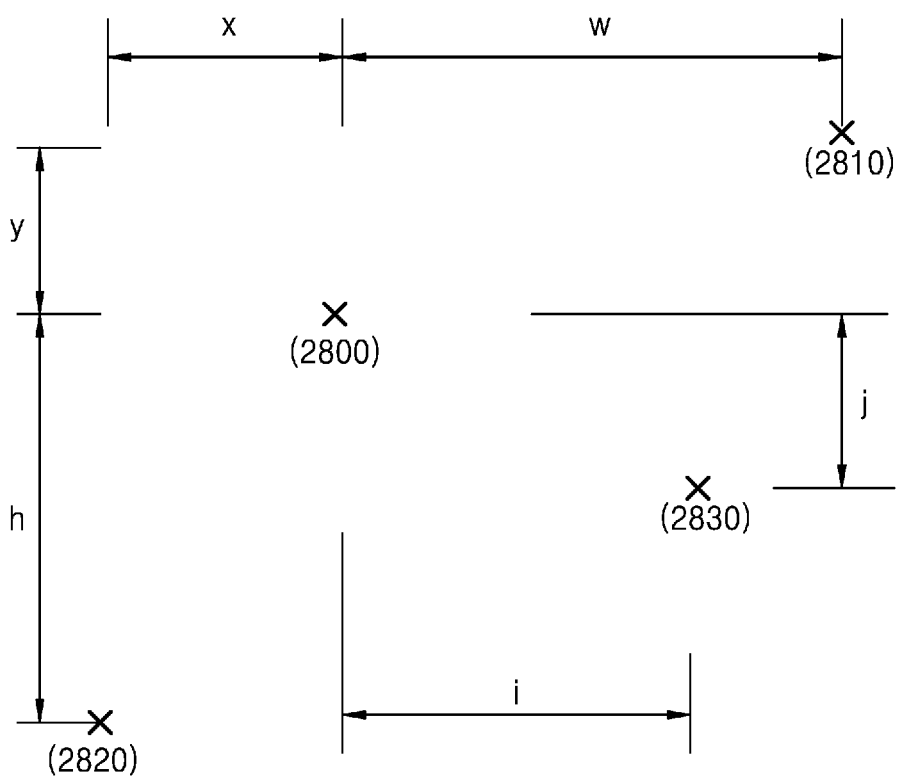
FIG. 23 illustrates a method of determining an affine motion vector of a current block in an affine mode.

FIG. 23 illustrates a method of determining an affine motion vector of a current block in an affine mode.

Equations 6 through 8 show a method of determining an affine motion vector of a current block according to motion vector extraction locations 2800, 2802 and 2804 of FIG. 23.

In Equations 6 and 7, w denotes a horizontal distance between the first motion vector extraction location 2800 and the second notion vector extraction location 2810. Also, h denotes a vertical distance between the first motion vector extraction location 2800 and the third motion vector extraction location 2820. Also, x denotes a horizontal distance between the first motion vector extraction location 2800 and the third motion vector extraction location 2820. Also, y denotes a vertical distance between the first motion vector extraction location 2800 and the second motion vector extraction location 2810.

$P_0$ denotes a first motion vector, $P_1$ denotes a second motion vector, and $P_2$ denotes a third motion vector. Also, dx and dy respectively denote a horizontal change amount and a vertical change amount.

$$dx = \frac{(hP_1 - yP_2) - (hP_0 - yP_0)}{wh - xy} \quad \text{[Equation 6]}$$

$$dy = \frac{(xP_1 - wP_2) - (xP_0 - wP_0)}{xy - wh} \quad \text{[Equation 7]}$$

The horizontal change amount is determined according to Equation 6, and the vertical change amount is determined according to Equation 7. According to Equation 8, a motion vector of a sample 2830 of a current block is determined according to the horizontal change amount and the vertical change amount. In Equation 8, P a denotes a motion vector of the sample 2830 of the current block. Also, i denotes a horizontal distance between the first motion vector extraction location 2800 and the sample 2830 of the current block, and j denotes a vertical distance between the first motion vector extraction location 2800 and the sample 2830 of the current block.

$$P_a = P_0 + idx + jdy \quad \text{[Equation 8]}$$

When three motion vectors and an extraction location of each motion vector are provided according to Equations 6 through 8, motion vectors of samples included in the current block may be determined. Accordingly, even when extraction locations of motion vectors are not aligned, motion vectors of samples included in the current block may be determined.

Hereinafter, various methods of generating a control point-based affine merge candidate will be described in detail with reference to FIGS. 24 through 27.

According to an embodiment, in a 6-parameter affine mode, three control point motion vectors are obtained. According to an embodiment, in order to obtain the three motion vectors, whether a left block and a right block of a current block are decoded is first determined. In FIG. 23, a method of determining an affine parameter when 1) only the left block of the current block is decoded, 2) only the right block of the current block is decoded, 3) both the left block and the right block of the current block are not decoded, and 4) both the left block and the right block of the current block are decoded will be sequentially described.

When only a left block of a current block is decoded, a first motion vector is obtained from adjacent samples of an upper left coordinate of the current block. According to an embodiment, the first motion vector may be determined to be a motion vector of a block corresponding to one of the adjacent samples. Also, the adjacent samples may be scanned according to a certain order, and when an inter-predicted adjacent block is discovered, scanning is stopped, and the first motion vector is extracted from the inter-predicted adjacent block. Also, according to an embodiment, the first motion vector may be determined to be an average of motion vectors obtained from a plurality of blocks corresponding to the adjacent samples.

A second motion vector is obtained from adjacent samples of an upper right coordinate of the current block. According to an embodiment, the second motion vector may be determined to be a motion vector of a block corresponding to one of the adjacent samples. Also, the adjacent samples may also be scanned according to a certain order, and when an inter-predicted adjacent block is discovered, scanning is stopped, and the second motion vector is extracted from the inter-predicted adjacent block. Also, according to an embodiment, the second motion vector may be determined to be an average of motion vectors obtained from a plurality of blocks corresponding to the adjacent samples.

Also, a third motion vector is obtained from adjacent samples of a lower left coordinate of the current block. According to an embodiment, the third motion vector may be determined to be a motion vector of a block corresponding to one of the adjacent samples. Also, the adjacent samples may also be scanned according to a certain order, and when an inter-predicted adjacent block is discovered, scanning is stopped, and the third motion vector is extracted from the inter-predicted adjacent block. Also, according to an embodiment, the third motion vector may be determined to be an average of motion vectors obtained from a plurality of blocks corresponding to the adjacent samples.

Also, a horizontal change rate is determined to be a value obtained by dividing a difference between the first motion vector and the second motion vector by a width of the current block. A vertical change rate is determined to be a value obtained by dividing a difference between the first motion vector and the third motion vector by a height of the current block.

When only a right block of a current block is decoded, like when only the left block of the current block is decoded, a first motion vector is obtained from adjacent samples of an upper left coordinate of the current block. Also, a second motion vector is obtained from adjacent samples of an upper right coordinate of the current block.

However, because a left block of the current block is not decoded, a third motion vector is obtained from adjacent samples of a lower right coordinate of the current block.

According to an embodiment, the third motion vector may be determined to be a motion vector of a block corresponding to one of the adjacent samples. Also, according to an embodiment, the third motion vector may be determined to be an average of motion vectors obtained from a plurality of blocks corresponding to the adjacent samples.

A horizontal change rate is determined to be a value obtained by dividing a difference between the first motion vector and the second motion vector by a width of the current block. A vertical change rate is determined to be a value obtained by dividing a difference between the second motion vector and the third motion vector by a height of the current block.

When both a left block and a right block of a current block are not decoded, like when only the left block of the current block is decoded, a first motion vector is obtained from adjacent samples of an upper left coordinate of the current block. Also, a second motion vector is obtained from adjacent samples of an upper right coordinate of the current block.

However, because the left block and the right block of the current block are not decoded, a third motion vector is determined from the first motion vector and the second motion vector. Accordingly, when a 6-parameter affine mode is applied to the current block and both the left block and the right block of the current block are not decoded, the current block is substantially decoded according to a 4-parameter affine mode.

When a left block and a right block of a current block are decoded, one of a method of determining a motion vector when only the left block of the current block is decoded and a method of determining a motion vector when only the right block of the current block is decoded may be selected. Accordingly, a first motion vector and a second motion vector may be respectively determined based on adjacent samples of an upper left coordinate of the current block and adjacent samples of an upper right coordinate of the current block. Also, a third motion vector may be determined based on a lower left motion vector or a lower right motion vector. The lower left motion vector is determined from adjacent samples of an upper left coordinate of the current block, and the lower right motion vector is determined from adjacent samples of an upper left coordinate of the current block.

A method of determining a motion vector may be determined from a higher level of the current block. For example, a processor 1700 may determine a default motion vector determining method with respect to the higher level of the current block. When the default motion vector determining method is a method of determining a motion vector when only the left block of the current block is decoded, a third motion vector may be determined according to the lower left motion vector of the current block.

Alternatively, the processor 1700 may obtain motion vector information indicating one of a method of determining a motion vector when only the left block of the current block is decoded and a method of determining a motion vector when only the right block of the current block is decoded, for the current block. Then, the method of determining a motion vector for the current block may be selected according to the motion vector information.

Figure 24:
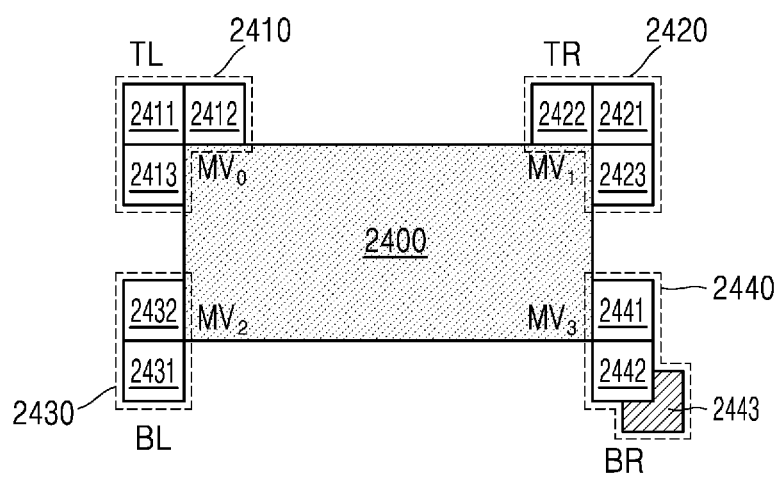
FIG. 24 illustrates a method of determining representative neighboring blocks adjacent to a corner of a current block and a control point motion vector derived from the representative neighboring blocks, according to an embodiment.

FIG. 24 illustrates a method of determining representative neighboring blocks adjacent to a corner of a current block and a control point motion vector derived from the representative neighboring blocks, according to an embodiment.

According to an embodiment, a control point motion vector $MV_0$ of an upper right corner of a current block 2400 may be determined based on a control point motion vector of a TL representative neighboring block 2410 adjacent to the upper left corner of the current block 2400. The TL representative neighboring block 2410 may be a block whose available motion information is initially obtained from among a neighboring block 2411 diagonally adjacent to the upper left corner of the current block 2400, a neighboring block 2412 adjacent to the upper left corner of the current block and an upper boundary of the current block, and a neighboring block 2413 adjacent to the upper left corner of the current block and a left boundary of the current block. That is, availability of motion information may be checked in an order of the neighboring blocks 2411, 2412, and 2413 adjacent to the upper left corner of the current block 2400, and a neighboring block whose available motion information acquisition is initially checked may be determined as the TL representative neighboring block 2410.

According to an embodiment, a control point motion vector $MV_1$ of an upper right corner of the current block 2400 may be determined based on a motion vector of a TR representative neighboring block 2420 adjacent to the upper right corner of the current block 2400. The TR representative neighboring block 2420 may be a block whose available motion information is initially obtained from among a neighboring block 2421 diagonally adjacent to the upper right corner of the current block, a neighboring block 2422 adjacent to the upper right corner of the current block and an upper boundary of the current block, and a neighboring block 2423 adjacent to the upper right corner of the current block and a right boundary of the current block. That is, availability of motion information may be checked in an order of the neighboring blocks 2421, 2422, and 2423 adjacent to the upper right corner of the current block 2400, and a neighboring block whose available motion vector acquisition is initially checked may be determined as the TR representative neighboring block 2420.

According to an embodiment, a control point motion vector $MV_2$ of a lower left corner of the current block 2400 may be determined based on a motion vector of a BL representative neighboring block 2430 adjacent to the lower left corner of the current block. The BL representative neighboring block 2430 may be a block whose available motion information is initially obtained from among a neighboring block 2431 diagonally adjacent to the lower left corner of the current block and a neighboring block 2432 adjacent to the lower left corner of the current block and a left boundary of the current block. That is, availability of motion information may be checked in an order of the neighboring blocks 2431 and 2432 adjacent to the lower left corner of the current block, and a neighboring block whose available motion information acquisition is initially checked may be determined as the BL representative neighboring block 2430.

According to an embodiment, a control point motion vector MV 3 of a lower right corner of the current block 2400 may be determined based on a motion vector of the BR representative neighboring block 2440 adjacent to the lower right corner of the current block 2400. When a right block of the current block is available, the BR representative neighboring block 2440 may be a block whose available motion information is initially obtained from among a neighboring block 2441 adjacent to the lower right corner of the current block and a right boundary of the current block and a neighboring block 2442 diagonally adjacent to the lower right corner of the current block. However, when the right block of the current block is not available, the BR representative neighboring block 2440 may be a collocated block 2443 located at a point diagonally adjacent to the lower right corner of the current block.

When availability of motion information of the TL representative neighboring block 2410, availability of motion information of the TR representative neighboring block 2420, and availability of motion information of the BL representative neighboring block 2430, respectively, indicate available, the video decoding apparatus 1700 and the video encoding apparatus 1900 according to an embodiment may determine that a first control point-based affine merge candidate Const1 corresponding to a block group including the TL representative neighboring block 2410, the TR representative neighboring block 2420, and the BL representative neighboring block 2430 is available.

When availability of motion information of the TL representative neighboring block 2410, availability of motion information of the TR representative neighboring block 2420, and availability of motion information of the BR representative neighboring block 2440, respectively, indicate available, the video decoding apparatus 1700 and the video encoding apparatus 1900 according to an embodiment may determine that a second control point-based affine merge candidate Const2 corresponding to a block group including the TL representative neighboring block 2410, the TR representative neighboring block 2420, and the BR representative neighboring block 2440 is available.

When availability of motion information of the TL representative neighboring block 2410, availability of motion information of the BL representative neighboring block 2430, and availability of motion information of the BR representative neighboring block 2440, respectively, indicate available, the video decoding apparatus 1700 and the video encoding apparatus 1900 according to an embodiment may determine that a third control point-based affine merge candidate Const3 corresponding to a block group including the TL representative neighboring block 2410, the BL representative neighboring block 2430, and the BR representative neighboring block 2440 is available.

When availability of motion information of the TR representative neighboring block 2420 adjacent to the upper right corner of the current block, availability of motion information of the BL representative neighboring block 2430 adjacent to the lower left corner of the current block, and availability of motion information of the BR representative neighboring block 2440 adjacent to the lower right corner of the current block, respectively, indicate available, the vide decoding apparatus 1700 and the video encoding apparatus 1900 according to an embodiment may determine that a fourth control point-based affine merge candidate Const4 corresponding to a block group including the TR representative neighboring block 2420, the BL representative neighboring block 2430, and the BR representative neighboring block 2440 is available.

When availability of motion information of the TL representative neighboring block 2410 adjacent to the upper left corner of the current block and availability of motion information of the TR representative neighboring block 2420 adjacent to the upper right corner of the current block, respectively, indicate available, the video decoding apparatus 1700 and the video encoding apparatus 1900 according to an embodiment may determine that a fifth control point-based affine merge candidate Const5 corresponding to a block group including the TL representative neighboring block 2410 and the TR representative neighboring block 2420 is available.

When availability of motion information of the TL representative neighboring block 2410 adjacent to the upper left corner of the current block and availability of motion information of the BL representative neighboring block 2420 adjacent to the lower left corner of the current block, respectively, indicate available, the video decoding apparatus 1700 and the video encoding apparatus 1900 according to an embodiment may determine that a sixth control point-based affine merge candidate Const6 corresponding to a block group including the TL representative neighboring block 2410 and the BL representative neighboring block 2420 is available.

The video decoding apparatus 1700 and the video encoding apparatus 1900 according to an embodiment may check availability of control point-based affine merge candidates in an order of the control point-based affine merge candidates Const1, Const2, Const3, Const4, Const5, and Const6, and may include available control point-based affine merge candidates in an affine merge candidate list in an order. However, when the number of merge candidates included in the affine merge candidate list is 5, control point-based affine merge candidates may no longer be added to the affine merge candidate list.

An affine merge index indicating a merge candidate selected from the affine merge candidate list may be signaled between the video decoding apparatus 1700 and the video encoding apparatus 1900 according to an embodiment. An affine motion vector of the current block 2400 may be determined based on a control point motion vector of the merge candidate selected from the affine merge candidate list.

Figure 25:
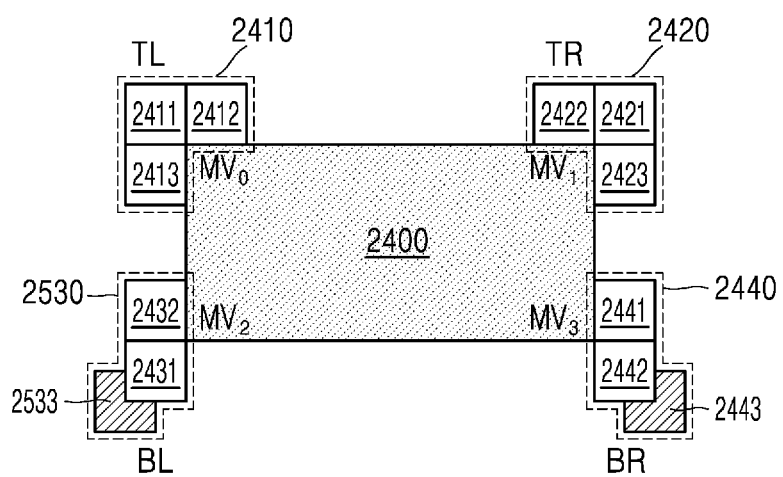
FIG. 25 illustrates a method of determining representative neighboring blocks adjacent to a corner of a current block and a control point motion vector derived from the representative neighboring blocks, according to another embodiment.

FIG. 25 illustrates a method of determining representative neighboring blocks adjacent to a corner of a current block and a control point motion vector derived from the representative neighboring blocks, according to another embodiment.

Referring to an embodiment of FIG. 25, the video decoding apparatus 1700 and the video encoding apparatus 1900 may determine the TL representative neighboring block 2410, the TR representative neighboring block 2420, a BL representative neighboring block 2530, and the BR representative neighboring block 2440. That is, when compared to an embodiment of FIG. 24, there is a difference in a method of determining the BL representative neighboring block 2530.

In detail, according to an embodiment of FIG. 25, the control point motion vector $MV_2$ of the lower left corner of the current block 2400 may be determined to be the same as a motion vector of the BL representative neighboring block 2530 adjacent to the lower left corner of the current block 2400. When a left block of the current block is available, the BL representative neighboring block 2530 may be a block whose available motion information is initially obtained from among the neighboring block 2431 diagonally adjacent to the lower left corner of the current block and the neighboring block 2432 adjacent to the lower left corner of the current block and the left boundary of the current block. However, when the left block of the current block is not available, the BL representative neighboring block 2530 may be a collocated block 2533 located at a point diagonally adjacent to the lower left corner of the current block.

A group of representative neighboring blocks included in the control point-based affine merge candidates Const1, Const2, Const3, Const4, Const5, and Const6 determined according to an embodiment of FIG. 25 is the same as that described with reference to FIG. 24. However, the BL representative neighboring block 2530, instead of the BL representative neighboring block 2430, may be included in Const1, Const3, Const4, and Const6.

Figure 26:
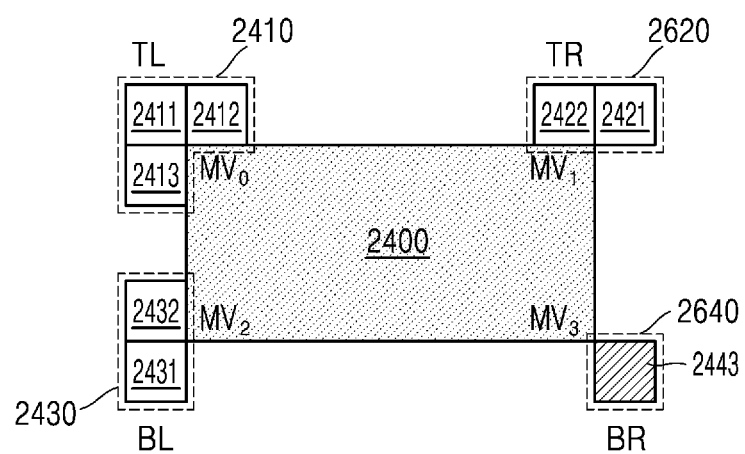
FIG. 26 illustrates a method of determining representative neighboring blocks adjacent to a corner of a current block and a control point motion vector derived from the representative neighboring blocks, according to another embodiment.

FIG. 26 illustrates a method of determining representative neighboring blocks adjacent to a corner of a current block and a control point motion vector derived from the representative neighboring blocks, according to another embodiment.

According to an embodiment of FIG. 26, the video decoding apparatus 1700 and the video encoding apparatus 1900 may determine the TL representative neighboring block 2410, a TR representative neighboring block 2620, the BL representative neighboring block 2430, and a BR representative neighboring block 2640. That is, when compared to an embodiment of FIG. 24, there is a difference in a method of determining the TR representative neighboring block 2620 and the BR representative neighboring block 2640.

In detail, the control point motion vector MV 1 of the upper right corner of the current block 2400 according to an embodiment of FIG. 26 may be determined to be the same as a motion vector of the TR representative neighboring block 2620 adjacent to the upper right corner of the current block 2400. The TR representative neighboring block 2620 may be a block whose available motion information is initially obtained from among the neighboring block 2421 diagonally adjacent to the upper right corner of the current block and the neighboring block 2422 adjacent to the upper right corner of the current block and the upper boundary of the current block. That is, availability of motion information may be checked in an order of the neighboring blocks 2421 and 2422 adjacent to the upper right corner of the current block 2400, and a neighboring block whose available motion information acquisition is initially checked may be determined as the TR representative neighboring block 2620. That is, when compared to an embodiment of FIG. 24, the neighboring block 2423 adjacent to the upper right corner and the right boundary of the current block 2400 is excluded from the TR representative neighboring block 2620.

Also, according to an embodiment of FIG. 26, the control point motion vector MV 3 of the lower right corner of the current block 2400 may be determined to be the same as a motion vector of the BR representative neighboring block 2640 adjacent to the upper right corner of the current block 2400. The BR representative neighboring block 2640 may be the collocated block 2443 located at a point diagonally adjacent to the lower right corner of the current block. That is, when compared to an embodiment of FIG. 24, the neighboring blocks 2441 and 2442 adjacent to the lower right corner and the right boundary of the current block 2400 may be excluded from the BR representative neighboring block 2640, and only the collocated block 2443 may be determined as the BR representative neighboring block 2640.

A group of representative neighboring blocks included in the control point-based affine merge candidates Const1, Const2, Const3, Const4, Const5, and Const6 determined according to an embodiment of FIG. 26 is the same as that described with reference to FIG. 24. However, the TR representative neighboring block 2620 and the BR representative neighboring block 2640, instead of the TR representative neighboring block 2420 and the BR representative neighboring block 2440, may be included in Const1, Const2, Const3, Const4, and Const5.

Figure 27:
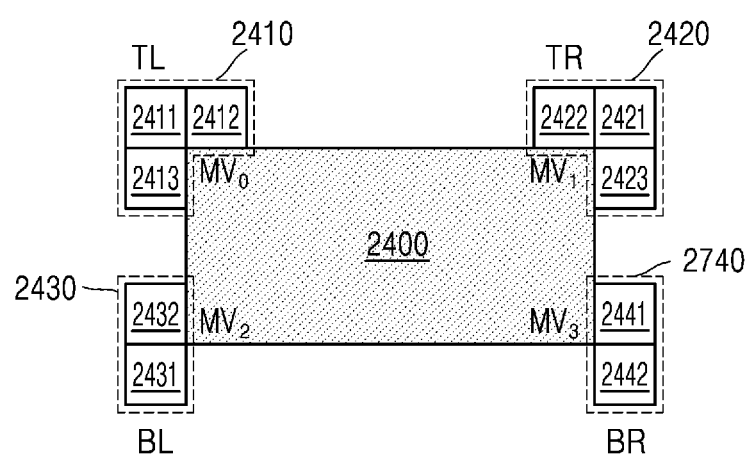
FIG. 27 illustrates a method of determining representative neighboring blocks adjacent to a corner of a current block and a control point motion vector derived from the representative neighboring blocks, according to another embodiment.

FIG. 27 illustrates a method of determining representative neighboring blocks adjacent to a corner of a current block and a control point motion vector derived from the representative neighboring blocks, according to another embodiment.

According to an embodiment of FIG. 27, the video decoding apparatus 1700 and the video encoding apparatus 1900 may determine the TL representative neighboring block 2410, the TR representative neighboring block 2420, the BL representative neighboring block 2430, and a BR representative neighboring block 2740. That is, when compared to an embodiment of FIG. 24, there is a difference in a method of determining the BR representative neighboring block 2740.

In detail, according to an embodiment of FIG. 27, a control point motion vector $MV_3$ of the lower right corner of the current block 2400 may be determined to be the same as a motion vector of the BR representative neighboring block 2740 adjacent to the lower right corner of the current block 2400. The BR representative neighboring block 2740 may be a block whose available motion information is initially obtained from among the neighboring block 2441 adjacent to the lower right corner of the current block and the right boundary of the current block and the neighboring block 2442 diagonally adjacent to the lower right corner of the current block.

A group of representative neighboring blocks included in the control point-based affine merge candidates Const1, Const2, Const3, Const4, Const5, and Const6 determined according to an embodiment of FIG. 27 is the same as that described with reference to FIG. 24. However, the BR representative neighboring block 2740, instead of the BR representative neighboring block 2440, may be included in Const2, Const3, and Const4.

Meanwhile, the embodiments of the present disclosure described above may be written as computer-executable programs, and the computer-executable programs may be stored in a medium.

The medium may continuously store the computer-executable programs, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as a compact disc read-only memory (CD-ROM) and a digital versatile disc (DVD), magneto-optical media such as a floptical disk, and a ROM, a random-access memory (RAM), and a flash memory, which are configured to store program instructions. The machine-readable storage medium may be provided as a non-transitory storage medium. Here, the term 'non-transitory' means that the storage medium is a tangible device and does not include a signal (e.g., an electromagnetic wave), but does not distinguish whether data is stored semi-permanently or temporarily in the storage medium. For example, the 'non-transitory storage medium' may include a buffer in which data is temporarily stored.

Also, other examples of the medium may include recording media and storage media managed by application stores distributing applications or by websites, servers, and the like supplying or distributing other various types of software.

According to an embodiment of the disclosure, methods according to various embodiments of the disclosure may be provided in a computer program product. The computer program product is a product purchasable between a seller and a purchaser. The computer program product may be distributed in a machine-readable recording medium (e.g., a CD-ROM), or may be distributed (e.g., downloaded or uploaded) online via an application store (e.g., Play Store™) or between two user devices (e.g., smartphones) directly. When distributed online, at least a part of the computer program product (e.g., a downloadable application) may be temporarily generated or at least temporarily stored in a machine-readable storage medium such as a memory of a manufacturer's server, a server of the application store, or a relay server.

While one or more embodiments of the present disclosure have been described with reference to the figures, it will be understood by one of ordinary skill in the art that various changes in form and details may be made therein without departing from the spirit and scope as defined by the following claims.

The invention claimed is:

1. A video decoding method, comprising:
   determining whether a right block is available for a current block according to a flag indicating a coding order of blocks including the current block and the right block;
   when the right block is available for the current block, obtaining first control point motion vectors as an affine merge candidate, using a motion vector of a first block in the right block, wherein the first block is adjacent to a lower right corner of the current block;
   when the right block is unavailable for the current block, obtaining the first control point motion vectors as the affine merge candidate, using a motion vector of a second block included in a first collocated picture, wherein the second block is a collocated block located at a point diagonally adjacent to the lower right corner of the current block;
   when a left block is available for the current block, obtaining second control point motion vectors as the affine merge candidate, using a motion vector of a third block in the left block, wherein the third block is adjacent to a lower left corner of the current block;
   when the left block is unavailable for the current block, obtaining the second control point motion vectors as the affine merge candidate, using a motion vector of a fourth block included in a second collocated picture, wherein the fourth block is a collocated block located at a point diagonally adjacent to the lower left corner of the current block; and
   obtaining predicted samples of the current block, using a motion vector included in an affine merge candidate list including the affine merge candidate.

2. A video encoding method comprising:
   determining whether a right block is available for a current block according to a flag indicating a coding order of blocks including the current block and the right block;
   when the right block is available for the current block, obtaining first control point motion vectors as an affine merge candidate, using a motion vector of a first block in the right block, wherein the first block is adjacent to a lower right corner of the current block;
   when the right block is unavailable for the current block, obtaining the first control point motion vectors as the affine merge candidate, using a motion vector of a second block included in a collocated picture, wherein the second block is a collocated block located at a point diagonally adjacent to the lower right corner of the current block;
   when a left block is available for the current block, obtaining second control point motion vectors as the affine merge candidate, using a motion vector of a third block in the left block, wherein the third block is adjacent to a lower left corner of the current block;
   when the left block is unavailable for the current block, obtaining the second control point motion vectors as the affine merge candidate, using a motion vector of a fourth block included in a second collocated picture, wherein the fourth block is a collocated block located at a point diagonally adjacent to the lower left corner of the current block; and
   obtaining predicted samples of the current block, using a motion vector included in an affine merge candidate list including the affine merge candidate.

3. A non-transitory computer-readable recording medium, storing a bitstream generated by executing a video encoding method, the bitstream comprising:
   a flag indicating a coding order of blocks including a current block and a right block,
   wherein the video encoding method comprises:
      determining whether the right block is available for the current block according to the flag;
      when the right block is available for the current block, obtaining first control point motion vectors as an affine merge candidate, using a motion vector of a first block in the right block, wherein the first block is adjacent to a lower right corner of the current block;
      when the right block is unavailable for the current block, obtaining the first control point motion vectors as the affine merge candidate, using a motion vector of a second block included in a collocated picture, wherein the second block is a collocated block located at a point diagonally adjacent to the lower right corner of the current block;
      when a left block is available for the current block, obtaining second control point motion vectors as the affine merge candidate, using a motion vector of a third block in the left block, wherein the third block is adjacent to a lower left corner of the current block;
      when the left block is unavailable for the current block, obtaining the second control point motion vectors as the affine merge candidate, using a motion vector of a fourth block included in a second collocated picture, wherein the fourth block is a collocated block located at a point diagonally adjacent to the lower left corner of the current block;
      obtaining predicted samples of the current block, using a motion vector included in an affine merge candidate list including the affine merge candidate; and
      outputting the bitstream including the flag indicating the coding order of the blocks.

* * * * *